(12) United States Patent
Eddaoudi et al.

(10) Patent No.: US 11,439,944 B2
(45) Date of Patent: *Sep. 13, 2022

(54) METAL-ORGANIC MATERIALS FOR $CO_2$ ADSORPTION

(71) Applicants: University of South Florida, Tampa, FL (US); King Abdullah University of Science and Technology, Thuwal (SA)

(72) Inventors: Mohamed Eddaoudi, Tampa, FL (US); Michael J. Zaworotko, Tampa, FL (US); Patrick Nugent, Tampa, FL (US); Stephen Burd, Tampa, FL (US); Ryan Luebke, Thuwal (SA); Youssef Belmabkhout, Thuwal (SA); Osama Shekhah, Thuwal (SA)

(73) Assignees: University of South Florida, Tampa, FL (US); King Abdullah University of Science and Technology, Thuwal (SA)

( * ) Notice: Subject to any disclaimer, the term of this patent is extended or adjusted under 35 U.S.C. 154(b) by 153 days.

This patent is subject to a terminal disclaimer.

(21) Appl. No.: 16/584,130

(22) Filed: Sep. 26, 2019

(65) Prior Publication Data

US 2020/0114297 A1 Apr. 16, 2020

Related U.S. Application Data

(63) Continuation-in-part of application No. 15/119,870, filed as application No. PCT/US2015/016382 on Feb.
(Continued)

(51) Int. Cl.
*B01D 53/02* (2006.01)
*B01D 53/04* (2006.01)
(Continued)

(52) U.S. Cl.
CPC .......... *B01D 53/04* (2013.01); *B01J 20/226* (2013.01); *B01J 20/2808* (2013.01);
(Continued)

(58) Field of Classification Search
CPC ........ B01D 2253/204; B01D 2253/308; B01D 2257/504; B01D 53/02; B01D 53/04; B01J 20/226; B01J 20/2808; Y02C 10/08
See application file for complete search history.

(56) References Cited

U.S. PATENT DOCUMENTS 9,492,778 B1 * 11/2016 Eddaoudi ............... B01J 20/226
2009/0120288 A1    5/2009 Lackner
(Continued)

FOREIGN PATENT DOCUMENTS

| WO | 2013144628 A1 | 10/2013 |
| WO | 2014013274 A1 | 1/2014 |
| WO | 2014015383 A1 | 1/2014 |

OTHER PUBLICATIONS

Subramanian et al., Porous Solids by Design—[Zn(4,4'-Bpy)(2)(Sif6))(N)Center-Dot-Xdmf, a Single Framework Octahedral Coordination Polymer with Large Square Channels (vol. 34, p. 2127, 1995). Angew. Chem. Int Ed. 34, 2127-2129, (1995).
(Continued)

*Primary Examiner* — Christopher P Jones
(74) *Attorney, Agent, or Firm* — Quarles & Brady LLP

(57) ABSTRACT

Embodiments of the present disclosure provide for metal-organic materials (MOMs), systems that exhibit permanent porosity and using hydrophobic MOMs to separate components in a gas, methods of separating $CO_2$ from a gas, and the like.

7 Claims, 10 Drawing Sheets

Related U.S. Application Data 18, 2015, now abandoned, and a continuation-in-part of application No. 13/800,690, filed on Mar. 13, 2013, now Pat. No. 9,138,719.

(60) Provisional application No. 61/941,151, filed on Feb. 18, 2014, provisional application No. 61/723,533, filed on Nov. 7, 2012, provisional application No. 61/682,017, filed on Aug. 10, 2012.

(51) Int. Cl.
    *B01J 20/22*     (2006.01)
    *B01J 20/28*     (2006.01)

(52) U.S. Cl.
    CPC ... *B01J 20/28061* (2013.01); *B01J 20/28064* (2013.01); *B01D 2253/204* (2013.01); *B01D 2253/306* (2013.01); *B01D 2253/308* (2013.01); *B01D 2256/10* (2013.01); *B01D 2256/16* (2013.01); *B01D 2256/245* (2013.01); *B01D 2257/504* (2013.01)

(56) References Cited

U.S. PATENT DOCUMENTS

| | | |
|---|---|---|
| 2009/0232861 A1 | 9/2009 | Wright |
| 2009/0301493 A1 | 12/2009 | McKenna |
| 2011/0138851 A1 | 6/2011 | Kuipers |
| 2011/0297558 A1 | 12/2011 | Hill |
| 2012/0115961 A1 | 5/2012 | Hafizovic |
| 2012/0133939 A1 | 5/2012 | Yaghi |
| 2013/0313193 A1 | 11/2013 | Nair |
| 2014/0018238 A1 | 1/2014 | Bajaj |

OTHER PUBLICATIONS

Lin et al., Molecular tectonics: modulation of size and shape of cuboid 3-D coordination networks. Crystengcomm 11, 189-191, (2009).
Burd, et al.. Highly Selective Carbon Dioxide Uptake by Cu(bpy-n)2(SiF6) (bpy-1=4,4'-Bipyridine; bpy-2=1,2-Bis(4-pyridyl)ethene). J. Am. Chem. Soc. 134, 3663-3666, (2012).
Naro et al., A new, methane adsorbent, porous coordination polymer [{CuSiF6{4,4'-bipyridine}{2)}{n)]. Angew. Chem. Int. Ed. 39, 2082-+, (2000).
Noro, S. et al. Framework engineering by anions and porous functionalities of Cu(II)/4,4'-bpy coordination polymers. J. Am. Chem. Soc. 124, 2568-2583, (2002).
Nugent et al., Porous materials with optimal adsorption thermodynamics and kinetics for CO2 separation. Nature 495, 80-84, (2013).
Uemura et al., Syntheses, Crystal Structures and Adsorption Properties of Ultramicroporous Coordination Polymers Constructed from Hexafluorosilicate Ions and Pyrazine. Eur. J. Inorg. Chem., 2329-2337, (2009).
Chu, S. Carbon Capture and Sequestration. Science 325, 1599-1599, doi:10.1126/science.1181637 (2009).
Major et al., Carbon Dioxide Removal From Air By Adsorbents. Industrial & Engineering Chemistry Process Design and Development 4, 327-333, doi:10.1021/i260015a019 (1965).
Stolaroff et al., Carbon dioxide capture from atmospheric air using sodium hydroxide spray. Environmental Science & Technology 42, 2728-2735, doi:10.1021/es702607w (2008).
Nikulshina et al., CO2 capture from atmospheric air via consecutive Cao-carbonation and VaCO3-calcination cycles in a fluidized-bed solar reactor. Chemical Engineering Journal 146, 244-248, doi:10.1016/j. cej.2008.06 005 (2009).
Goeppert et al., Air as the renewable carbon source of the future: an overview of CO2 capture from the atmosphere. Energy & Environmental Science 5, 7833-7853, doi:10.1039/c2ee21586a (2012).

Rege et al., Sorbents for air prepurification in air separation. Chemical Engineering Science 55, 4827-4838, doi:10.1016/s0009-2509{00)00122-6 (2000).
Rege et al., Air-prepurification by pressure swing adsorption using single/layered beds. Chemical Engineering Science 56, 27 45-2759, doi: 10.1016/s0009-2509(00)00531-5 (2001).
Santos et al., Contamination of zeolites used in oxygen production by PSA: Effects of Nater and carbon dioxide. Industrial & Engineering Chemistry Research 47, 6197-6203, doi:10.1021/ie800024c (2008).
Kordesch, K. et al. Alkaline fuel cells applications. J. Power Sources 86, 162-165 (2000).
Haring, H. W. Industrial Gases Processing. Wiley-VCH Verlag GmbH & Co: Weinheim (2008).
Belmabkhout et al., Adsorption of CO2-containing gas mixtures over amine-bearing pore-expanded MCM-41 silica: application for CO2 separation. Adsorption—Journal of the International Adsorption Society 17, 395-401, doi:10.1007/s10450-011-9348-0 (2011).
Emsting, J. Breathing systems in aerospace. IEE Seminar. Low Flow Anaesthesia Breathing Systems—Technology, Safety and Economics (Ref. No.1999/060), 7/1-4 (1999).
Satyapal et al., J.Performance and properties of a solid amine sorbent for carbon dioxide removal in space life support applications. Energy & Fuels 15, 250-255, doi:10.1021/ef0002391 (2001).
Mattox et al., Carbon dioxide removal system for closed loop atmosphere revitalization, candidate sorbents screening and test results. Acta Astronautica 86, 39-46 (2013).
Sayari et al., Stabilization of Amine-Containing CO2 Adsorbents: Dramatic Effect of Water Vapor, Journal of the American Chemical Society 132, 6312-6313, doi:10.1021/ja1013773 (2010).
Caskey et al., Dramatic tuning of carbon dioxide uptake via metal substitution in a coordination polymer with cylindrical pores. Journal of the American Chemical Society 130, 10870-10873, doi:10.1021/a8036096 (2008).
Sumida et al., Carbon Dioxide Capture in Metal-Organic Frameworks. Chemical Reviews 112, 724-781, doi: 10 .1021 / cr2003272 (2012).
Sayari et al., Flue gas treatment via CO2 adsorption. Chemical Engineering Journal 171, 760-774, doi:10.1016/j.cej.2011.02.007 (2011).
Xue et al., Tunable Rare-Earth fcu-MOFs: A Platform for Systematic Enhancement of CO2 Adsorption Energetics and Uptake. J. Am. Chem. Soc. 135, 7660-7667 (2013).
McDonald et al., Capture of Carbon Dioxide from Air and Flue Gas in the Alkylamine-Appended Metal-Organic Framework mmen-Mg-2{dobpdc). Journal of the American Chemical Society 134, 7056-7065, doi:10.1021/ja300034j (2012).
Choi et al., Application of Amine-Tethered Solid Sorbents for Direct CO2 Capture from the Ambient Air. Environ. Sci. Technol. 2011, 45, 2420-2427.
Didas et al., Role of Amine Structure on Carbon Dioxide Adsorption from Ultradilute Gas Streams such as Ambient Air. Chemsuschem 5, 2058-2064, doi:10.1002/cssc.201200196 {2012).
Xiang et al., Microporous metal-organic framework with potential for carbon dioxide capture at ambient conditions. Nature Communications 3, doi:10.1038/ncomms1956 (2012).
Conley et al., Ammonium hexaflurosilicate salts. Journal of Fluorine Chemistry 115, 155-160 (2002).
Sunho eta l., Modification of the Mg/DOBDC MOF with Amines to Enhance CO2 Adsorption from Ultradilute Gases. J. Phys. Chem. Lett., 2012, 3 (9), pp. 1136-1141.
Burd, Porous Metal-Organic Materials by Design Using Neutral Organic Ligands; p. 28, paragraphs [3]-[4].
Jouanneaux et al., WinMProf: visual Rietveld software., Materials Science Forum. vol. 378. Trans Tech Publications, 2001.
Altomare et al., EXPO2009: structure solution by powder data in direct and reciprocal space. Journal of Applied Crystallography 42.6 (2009): 1197-1202.
International Search Report and Written Opinion dated May 20, 2015 for PCT/US15/016382; Publication No. WO/2015/126945; pp. 1-11.

\* cited by examiner

US 11,439,944 B2

METAL-ORGANIC MATERIALS FOR $CO_2$ ADSORPTION

BACKGROUND

Metal-organic framework (MOF) materials that exhibit permanent porosity have received extensive interest due to their potential applications for gas storage or capture. However, many of the currently used MOFs have limitations, and thus, other types of MOFs having desired characteristics are needed to be used in certain applications.

SUMMARY

Embodiments of the present disclosure provide for metal-organic materials (MOMs), systems using MOMs to separate components in a gas, methods of separating $CO_2$ from a gas, and the like.

An embodiment of the method of capturing $CO_2$ in a gas, among others, includes: exposing the gas to a metal-organic material (MOM), wherein the gas includes $CO_2$ at a concentration in the gas of about 5% or less; and capturing the $CO_2$ in the MOM.

An embodiment of the system for capturing $CO_2$ in a gas mixture, among others, includes: a first structure including a metal-organic material (MOM), wherein the gas includes $CO_2$ at a concentration in the gas of about 5% or less; and a second structure for introducing the gas to the first structure, wherein $CO_2$ is removed from the gas after the exposure to the MOM to form a modified gas ($CO_2$ free), wherein the second structure flows the modified gas away from the first structure.

An embodiment of the method of separating components in a gas mixture, among others, includes: exposing a gas including a $CO_2$ and a second component to a metal-organic material (MOM), wherein the MOM has a greater relative affinity (kinetic and thermodynamic) for the $CO_2$ over a second component, wherein the $CO_2$ is at a concentration in the gas of about 5% or less; and capturing the first component in the MOM.

An embodiment of the system for separating components in a gas, among others, includes: a first structure including a metal-organic material (MOM), wherein the gas includes $CO_2$ and a second component, wherein the MOM has a greater relative affinity for $CO_2$ over the second component, wherein the $CO_2$ is at a concentration in the gas of about 5% or less; and a second structure for introducing the gas to the first structure, wherein $CO_2$ is removed from the gas after the exposure to the MOM to form a modified gas, wherein the second structure flows the modified gas away from the first structure.

An embodiment of the composition, among others, includes: a MOM comprising $[Cu(pyr)_2(SiF_6)]_n$, wherein n is 1 to 100,000,000, and wherein the MOM has a pore size of about 3.5 Å.

BRIEF DESCRIPTION OF THE DRAWINGS

Many aspects of the disclosed devices and methods can be better understood with reference to the following drawings. The components in the drawings are not necessarily to scale, emphasis instead being placed upon clearly illustrating the relevant principles. Moreover, in the drawings, like reference numerals designate corresponding parts throughout the several views.

DISCUSSION

Figure 1:
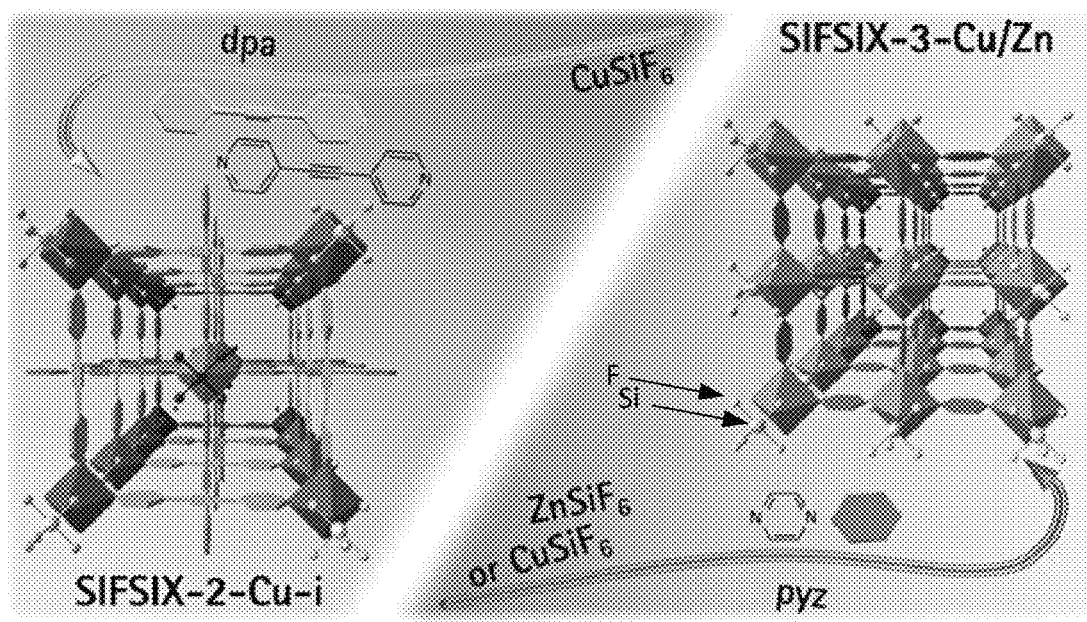
FIG. 1 is a schematic that illustrates the ability of pore size tuning in the channel structures of SIFSIX-2-Cu-i, SIFSIX-3-Zn or/and SIFSIX-3-Cu. In particular, a) SIFSIX-2-Cu-i; pores size 5.15 Å, BET apparent surface area ($N_2$ adsorption) 735 $m^2g^{-1}$; b) SIFSIX-3-Zn; pores size 3.84 Å, BET apparent surface area (determined from $CO_2$ adsorption isotherm) 250 $m^2g^{-1}$; and c) SIFSIX-3-Cu; pores size 3.3.5 Å, BET apparent surface area (determined from $CO_2$ adsorption isotherm) 300 $m^2g^{-1}$. Color code: Dipyridilacetylene (dpa, thick light grey polyhedral), pyrazine (pyz, medium grey polyhedral), Zn, Cu (darker grey polyhedral), Si (light grey spheres), F (light grey spheres). All guest molecules are omitted for clarity. Note that the grey net represents the interpenetrated net in SIFSIX-Cu-2-i.

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, organic chemistry, organometallic chemistry, coordination chemistry and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 25° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

General Discussion

Embodiments of the present disclosure provide for metal-organic materials (MOMs), systems using MOMs to separate components in a gas, methods of separating $CO_2$ from a gas, and the like. In an embodiment, the MOM can be used to remove or separate $CO_2$ in a gas at a variety of concentrations. In a particular embodiment, the MOM can be used to remove or separate trace levels of $CO_2$ in a gas (e.g., $CO_2$ at a concentration of about 5% or less in a gas) with high specificity and removal capacity, which can be advantageous in a number of industries.

The growing interest in combatting the greenhouse gas effect triggered a rising interest in the Direct Air Capture (CAD) as a viable option to reduce greenhouse gases emissions in uniform way. Although more challenging than post-combustion capture, embodiments of the present disclosure can be used in CAD since embodiments of the MOM have suitable uptake, kinetics, energetics and $CO_2$ selectivity, which enables removal or separation of trace levels of $CO_2$ concentration.

Removal of trace amounts of $CO_2$ from air for industrial purposes is important particularly for pre-purification of air when atmospheric air is used during the separation of nitrogen and oxygen. In a particular system, prior to air separation using cryogenic distillation or pressure swing adsorption (PSA), air must be $CO_2$ free to avoid (i) blockage of heat-exchange equipment due to frozen $CO_2$ during the liquefaction process and (ii) adsorbents (e.g., zeolites) contamination used for oxygen production by PSA. MOMs of the present disclosure can be used to remove $CO_2$ for air separation using cryogenic distillation or PSA.

In another application, alkaline Fuel Cells (AFCs) require the oxygen and hydrogen used as feedstock to be $CO_2$ free as trace amounts of $CO_2$ (300 ppm) degrade the electrolyte in AFCs. In this regard, MOMs of the present disclosure can be used in AFCs to remove $CO_2$.

Efficient removal of $CO_2$ at low concentrations is also vital for the proper operation of breathing systems in confined spaces such as submarines, planes, aerospace shuttles, and the like. In particular, in long-term space flight and submarine missions, $CO_2$ must be removed from the air and recycled because resupply opportunities are less frequent or non-existent. Humans require oxygen, and in return emit carbon dioxide. An average crew member requires approximately 0.84 kg of oxygen and emits approximately 1 kg of carbon dioxide. As a result, the ability to continuously purify the exhaled air (with a $CO_2$ concentration of 5% or less) can lead to an optimal recycling and considerable reduction in fresh air supply in closed, confined spaces such as space shuttles, planes and submarines. In this regard, embodiments of the MOMs can be used in breathing systems to manage $CO_2$ concentration.

Efficient $CO_2$ removal is also of importance in mining and rescue missions and diving. Thus, embodiments of the MOMs can be used to manage $CO_2$ concentration.

$CO_2$ removal is also a concern in medical applications such as anesthesia machines. The use of anesthesia machines is a growing clinical trend throughout the world, driven by the need to reduce cost and improve patient care. $CO_2$ removal in anesthesia machines is particularly important in semi- or closed rebreathing systems in which the rebreathing fraction is at least 50% of the exhaled gas volume is directed back to the patient after proper carbon dioxide removal in the next exhalation. Current solutions are costly, have limited recyclability, and have large disposal costs associated with them, while MOMs of the present disclosure can be used to remove and manage $CO_2$ concentration levels in anesthesia machines and in some situations can have a lifetime that is 10,000 times greater than current standards.

In an embodiment, the MOM can be porous and can be a three dimensional net so that molecules can be disposed (e.g., captured) within (e.g., pores or cavities) the MOM to the exclusion of other molecules. In an embodiment, the MOM combines sorption thermodynamics and kinetics to achieve advantageous results. Embodiments of the present disclosure describe MOMs that have no unsaturated metal centers and the pore walls have no hydrogen bonding donors or acceptors, while having strong electrostatics for inducing dipoles in polarizable molecules such as $CO_2$. For example, a gas such as $CO_2$ is absorbed faster and stronger than other gases in the gas mixture, so that $CO_2$ can be captured in the MOMs to the substantial exclusion of the other gases. In particular, the MOM can be used to remove or separate $CO_2$ in a gas, where the gas includes $CO_2$ at a concentration of about 5% or less. In an embodiment of the present disclosure have enhanced $CO_2$ interactions at the same time have reduced interactions with water vapor.

In an embodiment, the MOM can be a hydrophobic MOM. In an embodiment, the hydrophobic MOM can be used to separate $CO_2$ from one or more other gases, where the gas includes water vapor. Due to its hydrophobic characteristic, hydrophobic MOMs can be used in methods and systems that use gases that include water vapor, which was not previously possible in porous materials that exhibit strong physisorption towards $CO_2$. This is advantageous because other systems and methods that use other MOMs or other porous materials must separate water vapor from the gas prior to the gas being introduced to the other MOMs or porous materials since the other MOMs or porous materials have a higher affinity for the water vapor than $CO_2$. If the water vapor is not removed, the other MOMs are not effective at removing $CO_2$. In addition, MOMs of the present disclosure can remove trace levels of $CO_2$. Embodiments of the systems and methods can be simplified and result in reduced expenditure since the water vapor does not have to be removed prior to introduction to the hydrophobic MOMs. Even in the presence of water vapor, hydrophobic MOMs used in embodiments of the present disclosure are still effective at removing $CO_2$ and are highly selective in separating $CO_2$ from other gases such as $N_2$, $H_2$, and/or $CH_4$, even at trace levels of $CO_2$.

In particular, embodiments of the present disclosure can be used in $CO_2$ capture systems where the gas has trace levels of $CO_2$, and these can include direct air capture systems, pre-purification systems (e.g., PSA and cryogenic distillation), AFCs, breathing systems, mining and rescue missions, diving, and in medical applications. In addition, embodiments of the present disclosure can be used in post-combustion systems (e.g., flue gas to separate $CO_2$ and $N_2$), pre-combustion systems (e.g., shifted synthesis gas stream to separate $CO_2$ and $H_2$), and/or natural gas upgrading (e.g., natural gas cleanup to separate $CO_2$ and $CH_4$). In an embodiment, the hydrophobic MOMs can be used to separate other gases and can be used in processes such as He separation from natural gas, Ar separation, Kr separation, and $H_2/D_2$ separation.

Embodiments of the present disclosure provide for MOMs that are three dimensional nets that have a primitive cubic topology (See FIG. 1) that can be used in methods and systems of the present disclosure. In an embodiment, the MOM (e.g., $[Cu(pyr)_2(SiF_6)]_n$) can be designed and synthesized using two dimensional square grids (or nets) (e.g., Cu (4,4'-dipyridylacetylene)$_2$) that are linked via metal nodes using a pillar (e.g., $SiF_6^{2-}$). In an embodiment, the two dimensional square grids include metal cations, metal cluster molecular building blocks (MBBs), or metal-organic polyhedral supermolecular building blocks (SBBs). The MBBs or SBBs serve the geometric role of the node in a network and they are connected by organic molecules, inorganic anions and/or metal complexes, which serve as linkers. The two dimensional square grids are connected to one another using other linkers or pillars that connect the metal nodes. In an embodiment, the components of the MOM (the two dimensional square grids, and its components, and pillars) can be selected to design a MOM that can be used in a system or method that includes trace levels of $CO_2$ and/or water vapor and is highly effective at separating gases due to the MOM having a higher relative affinity for one component of the gas (e.g., $CO_2$) over one or more other components (e.g., $N_2$, $H_2$, and $CH_4$) in the gas. In this way not only is the MOM able to operate in methods and systems having high water vapor conditions, but the MOM is highly selective between or among $CO_2$ and other components, even where the $CO_2$ concentration is at trace levels.

In an embodiment, a method of the present disclosure includes exposing a gas to a MOM (e.g., $[Cu(pyr)_2(SiF_6)]_n$). As noted above, the MOM has a greater relative affinity for a first component (e.g., trace levels of $CO_2$) of the gas over a second component of the gas. The phrase "greater relative affinity" or similar phrases mean that a MOM can interact with a first component much more strongly than a second component so that the MOM and the first component interact to the substantial exclusion of the second component. Thus, the first component can be captured (e.g., separated) from the gas mixture to form a modified gas, where the modified gas includes the second component and a substantially reduced amount (e.g., greater than about 80% or more, about 90% or more, about 95% or more, about 99% or more, about 99.9% or more, removal of the first component from the gas) of the first component.

In an embodiment, the selectivity for $CO_2/N_2$ can be about 100 or more, about 500 or more, about 1000 or more, or about 2000 or more, based on column breakthrough experiments and at conditions of 25° C. and 1 bar total pressure using gas stream with $CO_2$ in the range 400 ppm to 50%. The column breakthrough tests were run by passing the non-treated gas stream trough a column containing the MOFs. The gas downstream the column is monitored by a gas analyzer to determine the change in composition of each gas.

In an embodiment, the MOM has a removal capacity of about 1.2-2 mmol/g (44-71 $cm^3$ (STP)/$cm^3$) at 400 ppm or about 2.2-2.5-mmol/g (80-88 $cm^3$ (STP)/$cm^3$) at 5000 ppm.

In an embodiment, the system for capturing $CO_2$ in a gas mixture can includes pressure (vacuum) swing adsorption, temperature swing adsorption, and combination thereof. In an embodiment, the method of separating components in a gas mixture can include removal of high $CO_2$ concentrations, removal of intermediate $CO_2$ concentrations, and very low $CO_2$ concentration. In an embodiment, the method of capturing $CO_2$ in a gas can include bulk $CO_2$ separation (50% $CO_2>$), $CO_2$ purification (<5%) and $CO_2$ ultra-purification (<1%).

As described herein, a substantial advantage of some embodiments of the present disclosure is that methods and systems using the MOMs can be conducted using a gas having water vapor, which is a completely unexpected result since most of other MOMs and related inorganic porous materials are typically hydrophilic and have a strong affinity for water so that the water vapor needs to be substantially or completely removed from the gas for the MOM to be commercially viable. In an embodiment, the water vapor in the gas can be at a concentration of about 1% to 10% at a temperature of about 273K to 340K.

In an embodiment, the gas can include two or more components and can include water vapor. In an embodiment, gas does not include water vapor. It should be noted that in many situations, the gas may primarily include a few components or only a few components that are important to the desired separation. In an embodiment, the component can include one or more of the following: $CO_2$ (e.g., trace levels), $N_2$, $H_2$, $CH_4$, He, hydrocarbons having 2 or more carbons (saturated or unsaturated and/or linear or branched), and a combination thereof. In an embodiment, $CO_2$ can be in the gas in an amount of about 400 ppm to 50% or in an amount of about 5% or less. In an embodiment, $N_2$ can be in the gas in an amount of about 50% to 99.99%. In an embodiment, $H_2$ can be in the gas in an amount of about 50% to 99.99%. In an embodiment, $CH_4$ can be in the gas in an amount of about 50% to 99.99%. In an embodiment, He can be in the gas in an amount of about 50% to 99.99%.

In an embodiment, the components in a gas can be separated using a system to introduce the gas to the MOM and remove the modified gas. In an embodiment, a first structure or device including the MOM can be interfaced with a second structure or device to introduce a gas to the first structure so that the gas and the MOM can interact so that the MOM can capture the first component (e.g., trace levels of $CO_2$). After a sufficient period of time and under appropriate temperature conditions, the remaining gas or modified gas can be removed from the first structure. This process can be repeated as appropriate for the particular system. After a period of time, the first component can be removed from the MOM and the MOM can be reused and/or recycled using an appropriate gas handling system.

In an embodiment, the first structure and the second structure can include those used in systems such as direct air capture systems, pre-purification systems (e.g., PSA and cryogenic distillation), AFCs, breathing systems, mining and rescue missions, diving, medical applications, post-combustion systems, pre-combustion systems, natural gas upgrading systems, and He separation systems. In particular, the first structure can include structures such as those used in typical systems mentioned above. In an embodiment, the second structure can include standard gas handling systems, valves, pumps, flow meters, and the like.

As noted above, MOMs can be three dimensional nets that can have a primitive cubic topology but they could also exhibit a different topology (See FIG. 1). In an embodiment, the MOM can be designed and synthesized using two dimensional square nets that are linked via metal nodes using a molecule or ion that serves the role of a pillar. In an embodiment, the two dimensional square nets can include metal cations, MBBs, or SBBs, and linkers can be used to bond the metal ions and the MBB and the SBB.

In an embodiment, MOMs can have one of the following generic structure: $(M(L)_a(P)_n)$, where M is the metal ion, L is the linker, and P is the pillar, a is 2 and n is 1. In an embodiment, the MOM has a pore size of about 3.3 Å to 3.9 Å or about 3.5 Å. L and P can be difunctional ligands that are capable of linking the metal clusters or ions such as pyrazine, 4,4'-bipyridine, 1,4-benzenedicarboxylate, hexaflourosilicate, and hexaflourotitanate. In an embodiment, these types of MOMs are described in references 13-15 below in the Example, which are incorporated herein by reference for how to describe MOMs and MOFs and the components of each.

In an embodiment, the metal cations can include $M^{1+}$ (e.g., Na, K, Li, Ag, etc.); $M^{2+}$ (e.g., Cu, Zn, Co, Mn, Mo, Cr, Fe, Ca, Ba, Cs, Pb, Pt, Pd, Ru, Rh, Cd, etc.); $M^{3+}$ (e.g. In, Fe, Y, Ln (Yb, Tb, etc.)); $M^{4+}$ (e.g., Zr, Ti, V, etc.); or other higher oxidative state metals such as +4, +5, +6, +7, and +8. In an embodiment, the MBBs and SBBs can include these metal cations as well.

In an embodiment, the linkers in the two dimensional square grid can include organic molecules, inorganic anions and/or metal complexes. In an embodiment, the linkers can include pyrazine (substituted and unsubstituted) and derivatives thereof, bipyridine (substituted and unsubstituted) and derivatives thereof, and the like.

In an embodiment, the pillars can include organic molecules, inorganic anions and/or metal complexes. In an embodiment, the pillars can include $SiF_6^{2-}$, $GeF_6^{2-}$, $TiF_6^{2-}$, $SnF_6^{2-}$, $PF_6^-$, and $NO_3^-$.

In an embodiment, MOMs of the present disclosure can be designed consistent with the description of $(M(L)_a(P)_n)$ so that the MOM has a pore size of about 3.3 Å to 3.9 Å or about 3.5 Å. As described in the Example, MOMs having pore sizes in this range and having a high charge density are effective at trapping $CO_2$ at concentrations of about 5% or less, about 4% or less, about 0.1 to 5%, or about 0.1 to 4%. In an embodiment, the MOM can include: $[Cu(pyr)_2(SiF_6)]_n$, wherein n is 1 to 100,000,000.

EXAMPLE

Now having described the embodiments of the present disclosure, in general, the Examples describe some additional embodiments of the present disclosure. While embodiments of present disclosure are described in connection with the Examples and the corresponding text and figures, there is no intent to limit embodiments of the present disclosure to these descriptions. On the contrary, the intent is to cover all alternatives, modifications, and equivalents included within the spirit and scope of embodiments of the present disclosure.

Example 1

Brief Introduction

Direct air capture (DAC) is another alternative approach to mitigate the increasing $CO_2$ emissions while accounting for both carbon emissions from various sources such as transportation sector and stationary power plants sources. We previously we reported how a material design and engineering approaches to pore size control, in combination with suitable sorption energetics of favourable electrostatics from an array of inorganic anions, affords MOFs with unprecedented $CO_2$ uptake and selectivity in the context of bulk (5% and higher) $CO_2$ capture. Herein, we report how this same approach can be used to develop isostructural materials rather suitable to air capture and traces $CO_2$ removal. In contrast to amine scrubbing systems, amine supported materials, and sodalime sorbents, these materials exhibit also very high but non-reactive and uniformly distributed $CO_2$ energetics, pushing the borders in enhancement of physical interactions in MOFs, in addition to fully reversible physical driven adsorption-desorption operations at very mild condition. This work shows that due to their ability for rational pore size modification and inorganic-organics moieties substitution, MOFs with periodically arrayed hexaflourosilicate (SIFSIX) pillars offers for the first time remarkable $CO_2$ adsorption, uptake and selectivity in highly diluted gas streams that other plain class of materials are unable to achieve.

Introduction/Discussion:

The growing interest in combatting the greenhouse gas effect[1] triggered a rising interest in the direct air capture (DAC) as a viable option to reduce greenhouse gases emissions in a uniform way.[2-5] Although more challenging than post-combustion capture, it is recognized that DAC might be feasible, provided that suitable adsorbent combining optimum uptake, kinetics, energetics and $CO_2$ selectivity is available at traces $CO_2$ concentration.[6]

Particularly the removal of traces of $CO_2$ from air for industrial purposes is a growing area of research and development, owing to its substantial importance particularly for pre-purification of air, when atmospheric air is used during the separation of nitrogen and oxygen. In fact, prior to air separation using cryogenic distillation or pressure swing adsorption (PSA), air must be $CO_2$ free to avoid (i) blockage of heat-exchange equipment as a result of frozen $CO_2$ during the liquefaction process[7,8] and (ii) adsorbents (e.g., zeolites) contamination used for oxygen production by PSA.[9]

At the same level of importance, alkaline fuel cells (AFCs) require oxygen and hydrogen used as feedstock to be $CO_2$ free. Indeed, trace amounts of $CO_2$ (300 ppm) degrade the electrolyte in AFCs.[10-12] In addition, humans require oxygen, and in return emit carbon dioxide. Therefore, efficient removal of $CO_2$ at low concentrations is also vital for the proper operation of breathing systems in confined spaces such as submarines and aerospace shuttles.[13-15] In fact, in long-term space flight and submarine missions, $CO_2$ must be removed from the air and recycled because resupply opportunities are less frequent or non-existent. An average crew member requires approximately 0.84 kg of oxygen and emits approximately 1 kg of carbon dioxide.[15] Thus the ability to continuously purify the exhaled air (with a maximum $CO_2$ concentration of 2-5%) will lead to an optimal recycling and considerable reduction in fresh air supply in closed, confined spaces.

Efficient $CO_2$ removal and resupply of fresh air is also of prime importance in mining and rescue missions,[16] diving, and most importantly in medical applications such as anaesthesia machines.[17] The use of anaesthesia machine was and still a growing clinical trend throughout the world, driven by the need to reduce cost and improve patient care via the use of efficient $CO_2$ sorbents. $CO_2$ removal feature in anaesthesia machine is particularly important in semi-closed or closed rebreathing systems, as the rebreathing fraction is at least 50% of the exhaled gas volume, directed back to the patient after proper $CO_2$ removal in the next exhalation. Sodalime is currently the sorbent of choice in most commercially available anaesthesia machines. This sorbent exhibits a high $CO_2$ removal efficiency from exhaled air, with an average continuous operation of about 24 hours using a pre-packed commercial cartridge.[18] Nevertheless, a major drawback of this technology is that one sodalime cartridge can only be used for a single cycle and is non-regenerable, generating therefore a huge amount of waste that should be disposed properly. Recently, a growing interest to low $CO_2$ concentration removal applications,[12] was spotted and few materials were reported to adsorb efficiently traces of $CO_2$, particularly with regards to DAC using a variety of amine supported (silica based) materials.[12,19] Recently, metal-organic frameworks (MOFs), which is a burgeoning class of porous materials, was intensively investigated for intermediate and high $CO_2$ concentration removal applications such as post-combustion, pre-combustion capture, natural gas and biogas upgrading.[20-23] However, the capability of MOFs to remove traces and low $CO_2$ concentration from gas streams was rarely debated.[24-27] The main reason for this lack of studies is that most of MOFs reported so far with or without unsaturated metal sites (UMC) or/and functionalized ligands exhibited relatively low selectivity and uptake particularly at low $CO_2$ partial pressure. With the aim to enhance the $CO_2$ adsorption energetics and uptake in MOFs and covalent organic frameworks (COFs), a few scientist,[26,27] were inspired by the amine chemistry and the huge know how gained so far from amine-supported silica.[20-22] In fact, recently, Jones and co-workers studied for the first time the effect of ethylenediamine (ED) grafting with Mg-MOF-74 as a support for $CO_2$ adsorption from ultra-dilute gas streams such as ambient air.[28] Long and co-workers investigated the effect of N,N-dimethylethylenediamine grafting for DAC using an expanded version of Mg-MOF-74.[28] Thus, the few strategies reported so far targeting air capture using MOFs rely on the ability of grafted amines to form strong chemical bonding (at least 70 kJ/mol) with $CO_2$, affording high affinity toward $CO_2$ and therefore high $CO_2$ selectivity. Interestingly, there is no work reported so far on tuning pore size of plain MOFs with the optimal $CO_2$ energetics (strong, uniform and enough low to allow reversible physical adsorption-desorption) to target traces $CO_2$ removal in general and DAC application in particular.

Figure 11:
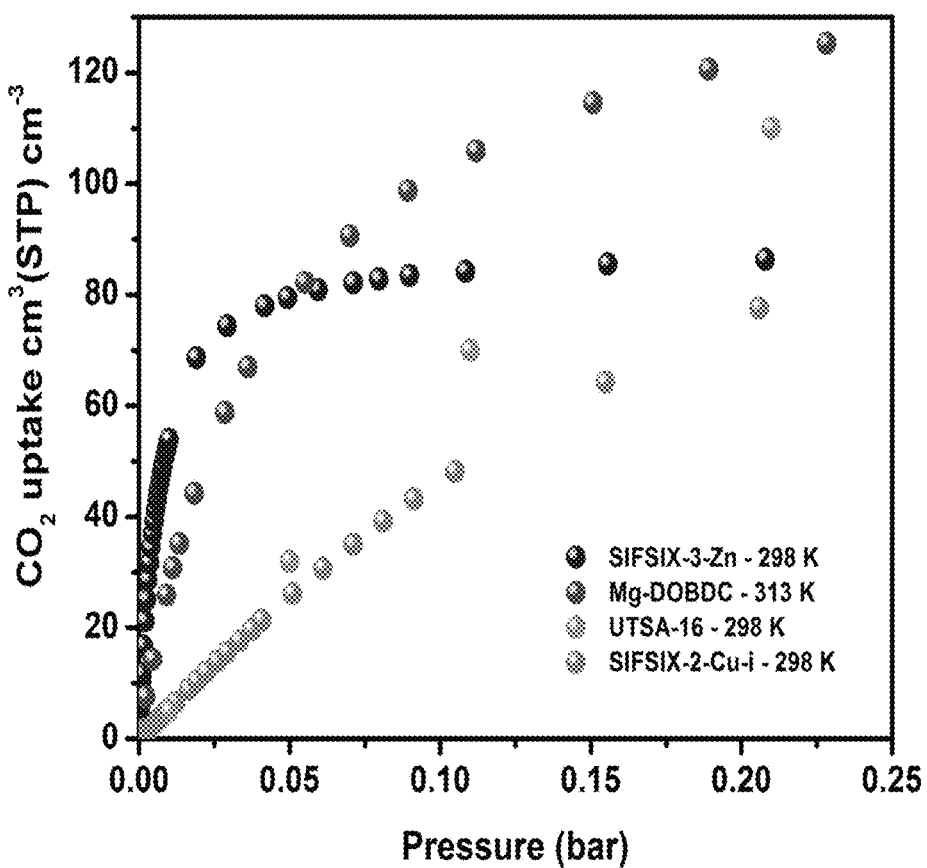
FIG. 11 illustrates a $CO_2$ adsorption isotherms at very low pressures up to 0.25 bar (250 mbar) for SIFSIX-Cu-3, SIFSIX-Zn-3 and SIFSIX-Cu-2-i as compared to Mg-MOF-74[*J. Am. Chem. Soc.* 130, 10870-10871 (2008)] and UTSA-16 [*Nat. Commun.* 3:954 doi: 10.1038/ncomms1956 (2012)].
Figure 12:
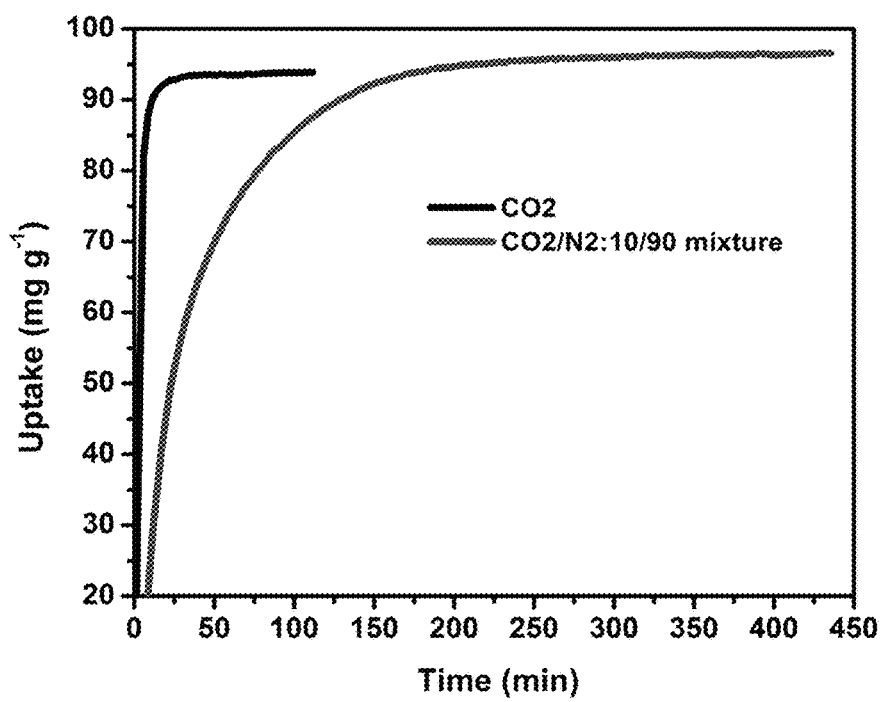
FIG. 12 illustrates competitive adsorption kinetics of $CO_2/N_2$:10/90 gas mixture as compared to the kinetics of adsorption of pure $CO_2$ at 1 bar and 298 K.

Results and Discussion:

Recently, we reported a $CO_2$ study on a series of isoreticular MOFs with periodically arrayed hexaflourosilicate (SIFSIX) pillars, called SIFSIX-2-Cu-i and SIFSIX-3-Zn (FIG. 1). These porous MOFs having a combination of tunable pore size (rather than large surface area) coupled with requisite chemistry led to materials exhibiting fast and highly selective $CO_2$ behaviour over $N_2$, $CH_4$ and $H_2$ with uniformly aligned strong $CO_2$ adsorption sites.[23] Particularly the denser isoreticular analogue of SIFSIX pillars; SIFSIX-3-Zn revealed very steeper variable $CO_2$ adsorption isotherms (FIG. 12) than SIFSIX-2-Cu-I (FIG. 11) suitable for post-combustion capture (at the $CO_2$ partial pressure of 100-mbar), but also excellent features suitable for natural and biogas upgrading, as well as pre-combustion capture[20] (high $CO_2$ concentration and high pressure).

Figure 13:
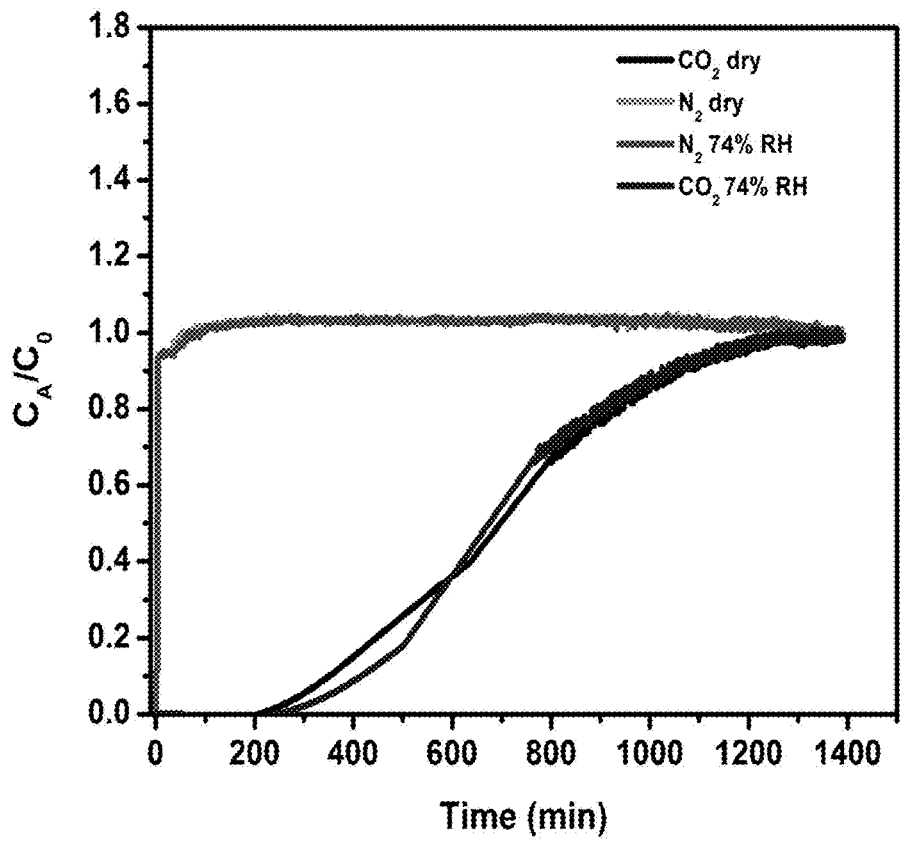
FIG. 13 illustrates a column breakthrough test of $CO_2$/$N_2$:1000 ppm/99.99% for SIFSIX-Zn-3 in dry as well as at 74% RH.

Because of the importance of this discovery and the unprecedented steep $CO_2$ adsorption isotherms over a wide range of temperature, particularly for this class of materials; MOFs, we found it compelling to explore the capability of these SIFSIX MOFs for $CO_2$ adsorption in trace concentration (diluted streams in vacuum or in mixture containing large fraction of $N_2$ up to 95%). In order to highlight the concealed capability of these MOFs for low $CO_2$ concentration related applications involving $CO_2$ concentration below 5% (below 50 mbar $CO_2$ partial pressure) such as anaesthesia machines, pre-purification before air separation and air capture, single gas $CO_2$ adsorption was investigated for SIFSIX-2-Cu-i and SIFSIX-3-Zn. Upon contraction the pore size from 5.15 Å (for SIFSIX-2-Cu-i) to 3.8 Å (for SIFSIX-3-Zn) the $CO_2$ uptake increased drastically (FIG. 13) resulting to the highest $CO_2$ uptake ever reported for MOFs in the range of below 5% $CO_2$. For example, SIFSIX-3-Zn showed an order of magnitude higher volumetric $CO_2$ uptake (55 $cm^3$ (STP)/$cm^3$) than Mg-MOF-74,[20] (28 $cm^3$ (STP)/$cm^3$) at 10 mbar (1% $CO_2$), while UTSA-16,[29] exhibited much lower $CO_2$ uptake similar to SIFSIX-2-Cu-I.

To further investigate the effect of tuning further the pore size on the adsorption properties of SIFSIX-3-M, and by studying other coordination polymers constructed from hexaflourosilicate ions with pyrazine, we found that the bonding of the Cu(II) with pyrazine leads to a slightly shorter M-N(nitrogen) bond than the zinc (see table Si in SI),[30] which will lead to further decrease in the pore size of the constructed 3D MOF, if we could substitute Zn by Cu. In order to explore this prospect, we deliberately intended to prepare the SIFSIX-3-Cu analogue which was never reported before and it was successfully prepared by layering a methanol solution (5.0 mL) of pyrazine (pyz, 0.30 g, 3.0 mmol) in a glass tube onto a methanol solution (5.0 mL) of $CuSiF_6 \cdot xH_2O$ (0.325 g, 0.6 mmol). Upon layering, an extremely fast formation of light violet powder was observed, and the powder was left for 24 hours in the mother solution. The powder was then collected and washed extensively with methanol then dried under vacuum and characterized using powder X-ray diffraction (PXRD).

Figure 5:
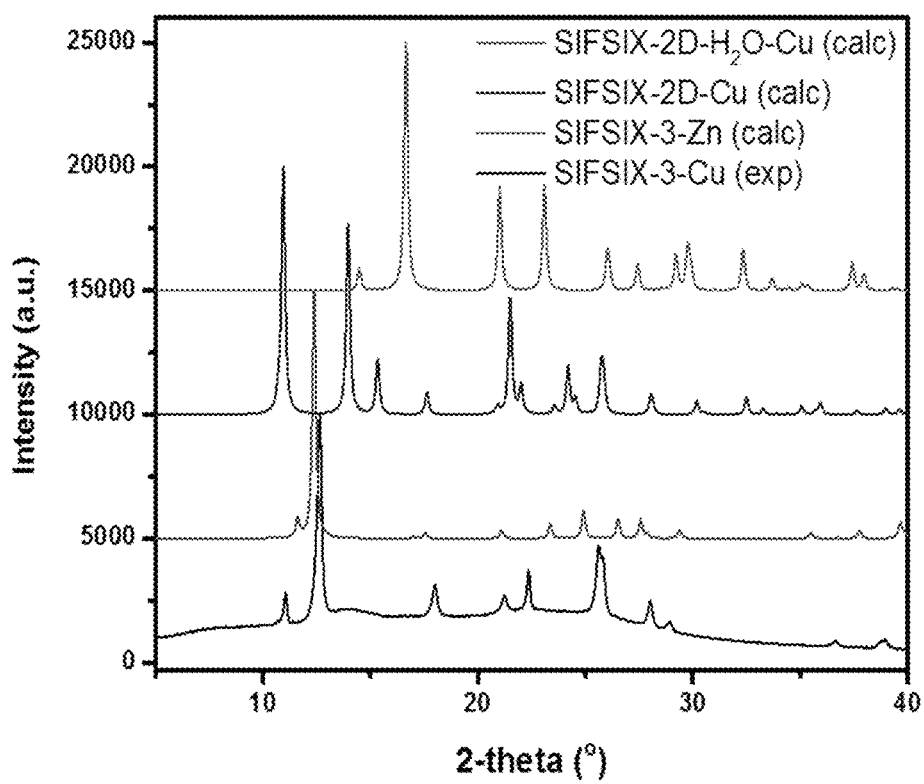
FIG. 5 illustrates a comparison of PXRD diagrams of SIFSIX-3-Cu with other SIFSIX-pyz MOFs ($\lambda_{Cu}$=1.5406 nm).
Figure 6:
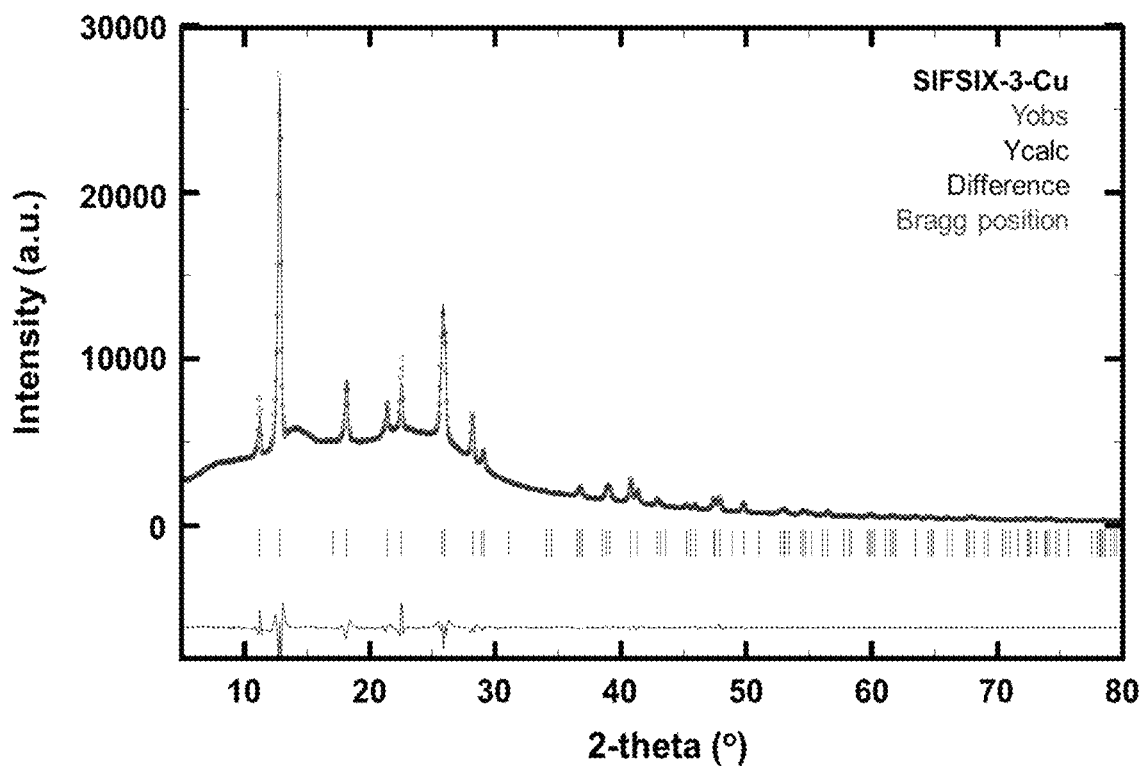
FIG. 6 illustrates a Lebail fit for SIFSIX-3-Cu ($\lambda_{Cu}$=1.5406 nm).
Figure 7:
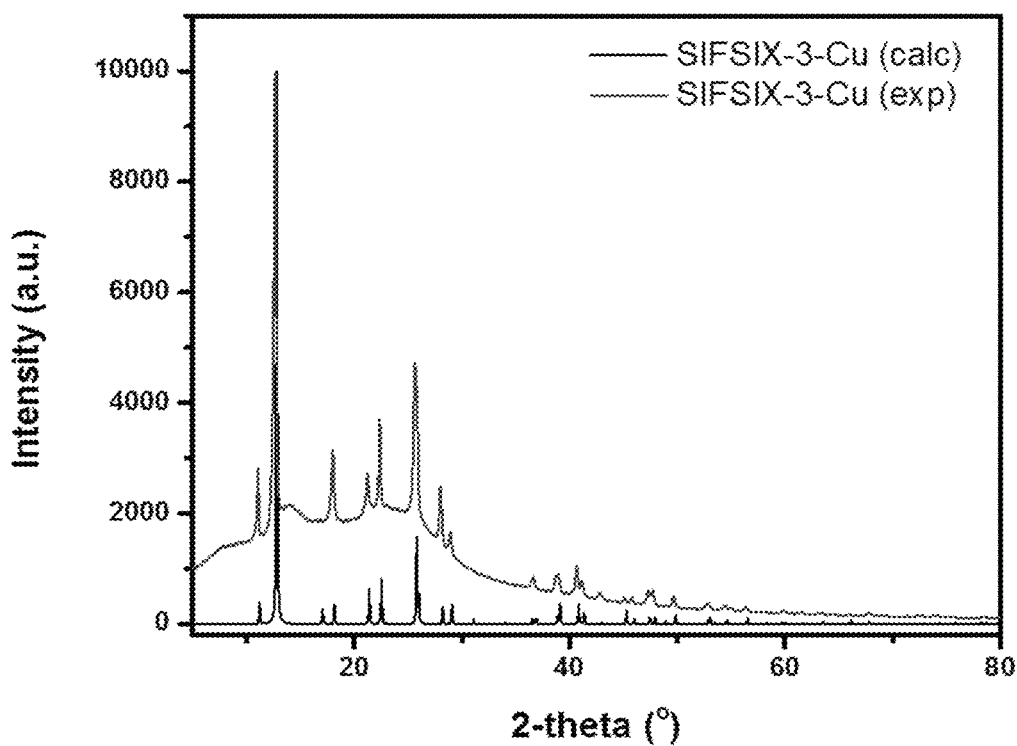
FIG. 7 illustrates a comparison of calculated and experimental PXRD diagrams for SIFSIX-3-Cu ($\lambda_{Cu}$=1.5406 nm).
Figure 8:
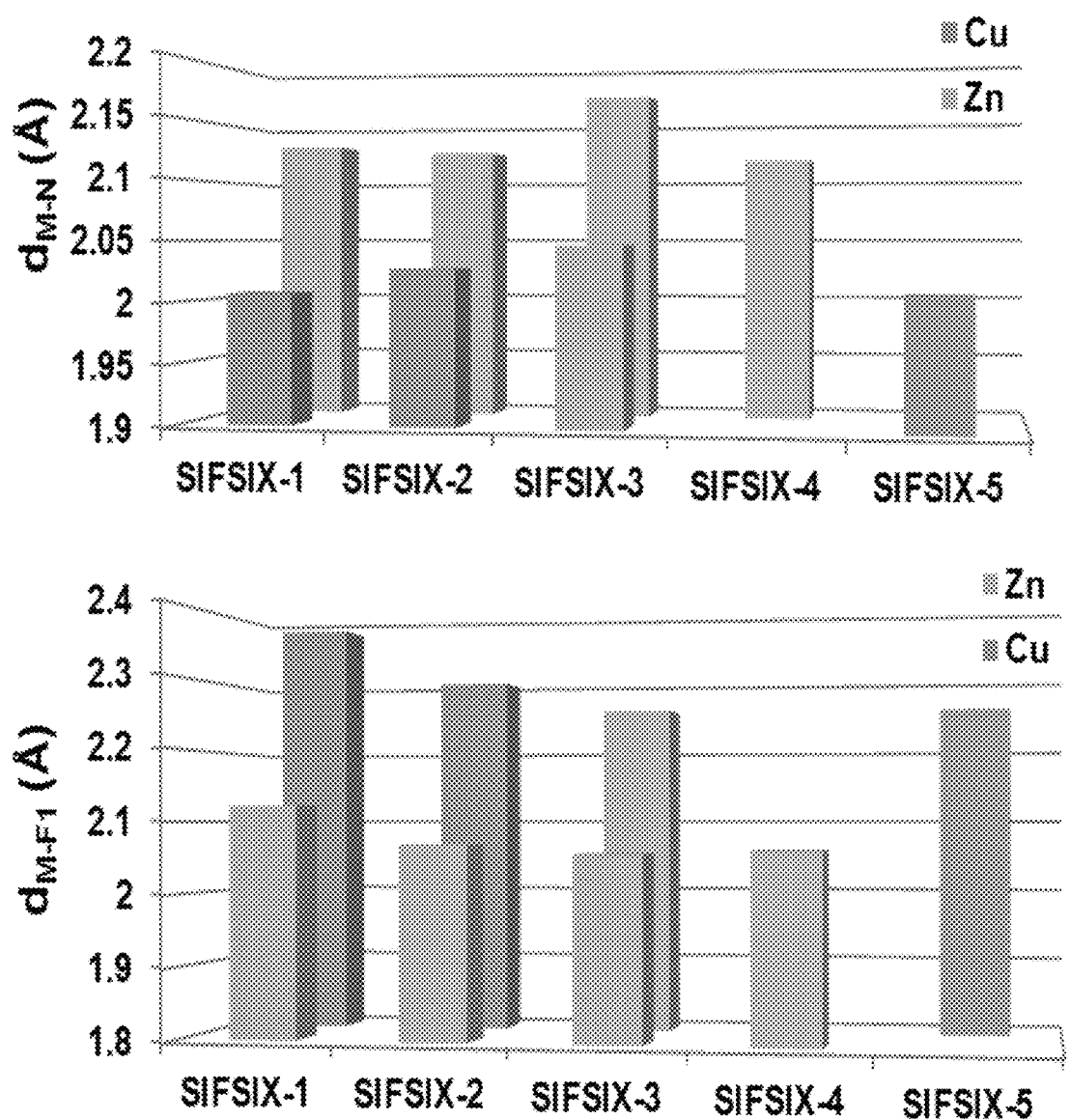
FIG. 8 illustrates a comparison of the metal environment in SIFSIX based MOFs through the metal-nitrogen (top) and metal-fluorine (bottom) distances.
Figure 9:
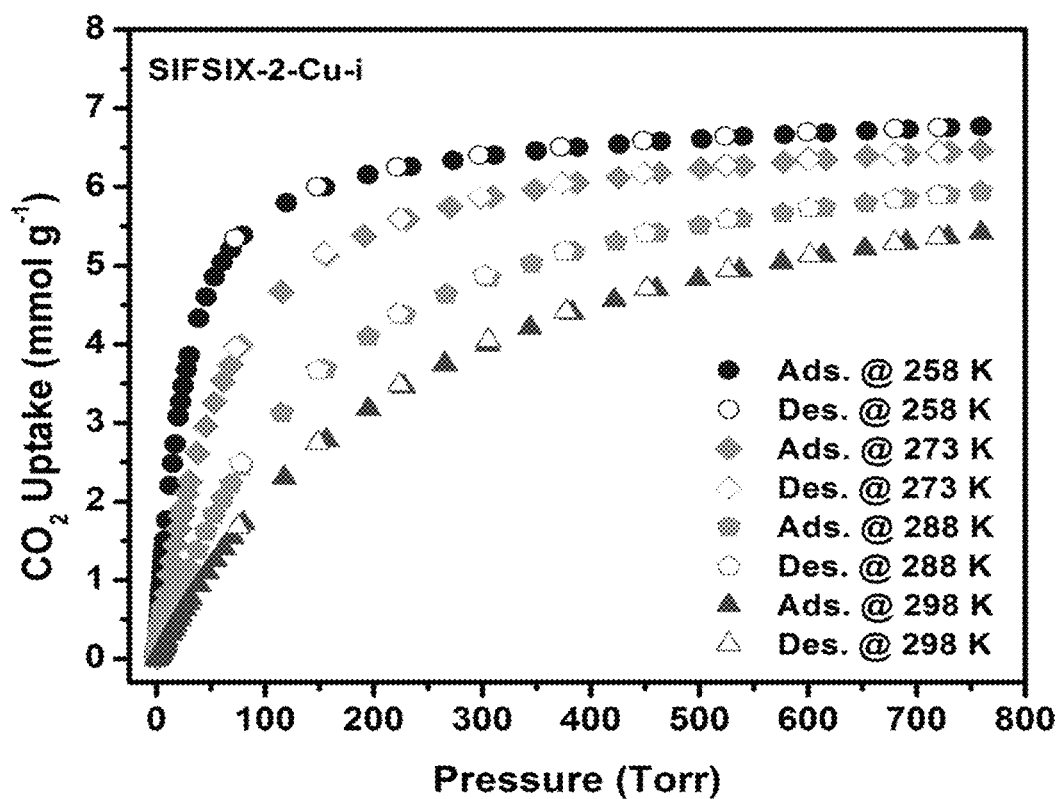
FIG. 9 illustrates variable temperature adsorption isotherms for SIFISX-2-Cu-i.

The PXRD diagram was found not to match with any of the related reported structures, i.e. the Cu-2D structures or the 3D Zn analogue reported by Kita et al.[30] (FIG. 5). Despite extensive attempts, it was not possible to isolate synthetic conditions affording single crystals of sufficient size for single crystal diffraction (SCD), and the structure was then solved from PXRD using direct methods. The structural model was then energetically and geometrically refined, and the good agreement between experimental and calculated PXRD diagrams validates our model (FIGS. 6 and 7). Analysis of the structure revealed the formula of the Cu analogue; [Cu(SiF$_6$)(pyz)$_2$.solv]. As initially expected, it is in very good agreement with the 3D structure of the Zn analogue reported previously (FIG. 1),[30] but with a slightly smaller unit cell (375 vs. 388 Å$^3$) attributed to the stronger bonding between the Cu(II) and the pyrazine (Table S1 in SI).[30] The smaller unit cell of the Cu analogue was in good agreement with the relatively sharp pore size distribution (PSD) analysis centred at 3.5 Å (average pore size), as determined from the $CO_2$ isotherms, which shows smaller average pore size than the SIFSIX-3-Zn (3.5-4 Å) (FIG. 2(right)). The thermal gravimetric analysis (TGA) of the SIFSIX-3-Cu was tested in the temperature range 25-250° C. The thermogram (FIG. 8) shows a mass loss of about 10% for the dried sample in the range of 50-150 corresponding to guest molecules. Further gradual loss was observed above 150° C. due to the decomposition and loss of pyrazine and SiF6 ions. The TGA for the SIFSIX-3-Cu is in a good agreement with the one reported for the SIFSIX-3-Zn.[30] Infra-red (IR) spectrum for the SIFSIX-3-Cu (FIG. 9), exhibits bands characteristic of the C—H aromatic bonds of the pyrazine at 3114 and 3073 cm$^{-1}$ and bands characteristic for the C-N bond at 1445, 1122 and 1070 cm$^{-1}$. In addition to that the characteristic bands for the octahedral SiF6 were also observed at 743 and 833 cm$^{-1}$.[31]

Figure 2A:
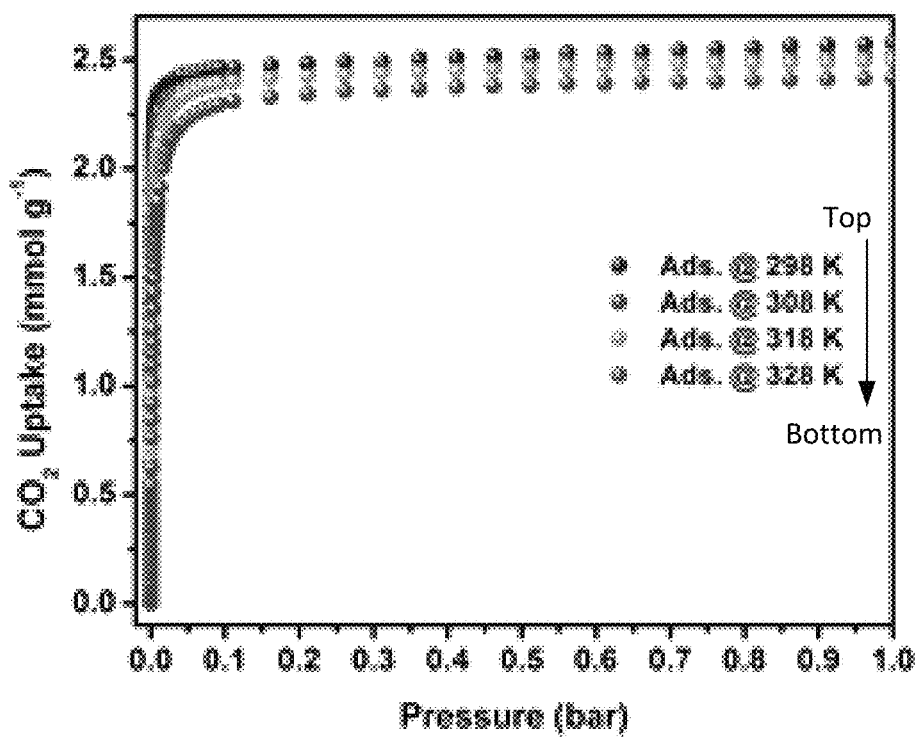
FIG. 2A illustrates the variable temperature adsorption isotherms of $CO_2$ for SIFSIX-Cu-3).
Figure 2B:
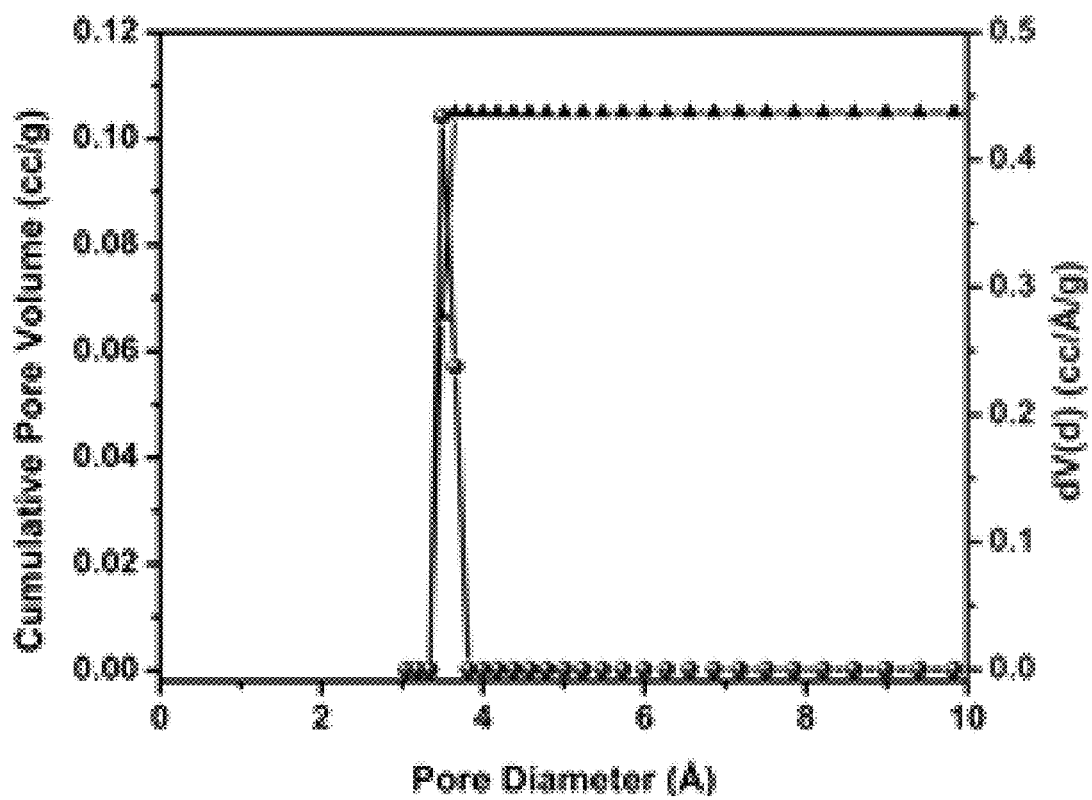
FIG. 2B illustrates the pore size distribution from $CO_2$ sorption isotherms at 77 K for SIFSIX-Cu-3.

It is logically expected that this new Cu analogue should at least show the same promising adsorption properties as the SIFSIX-3-Zn.[23] Surprisingly, the Cu analogue showed even steeper variable temperature adsorption isotherms (FIG. 2(left)) at very low pressure indicative of the stronger $CO_2$-SIFSIX-3-Cu interactions.

Figure 3A:
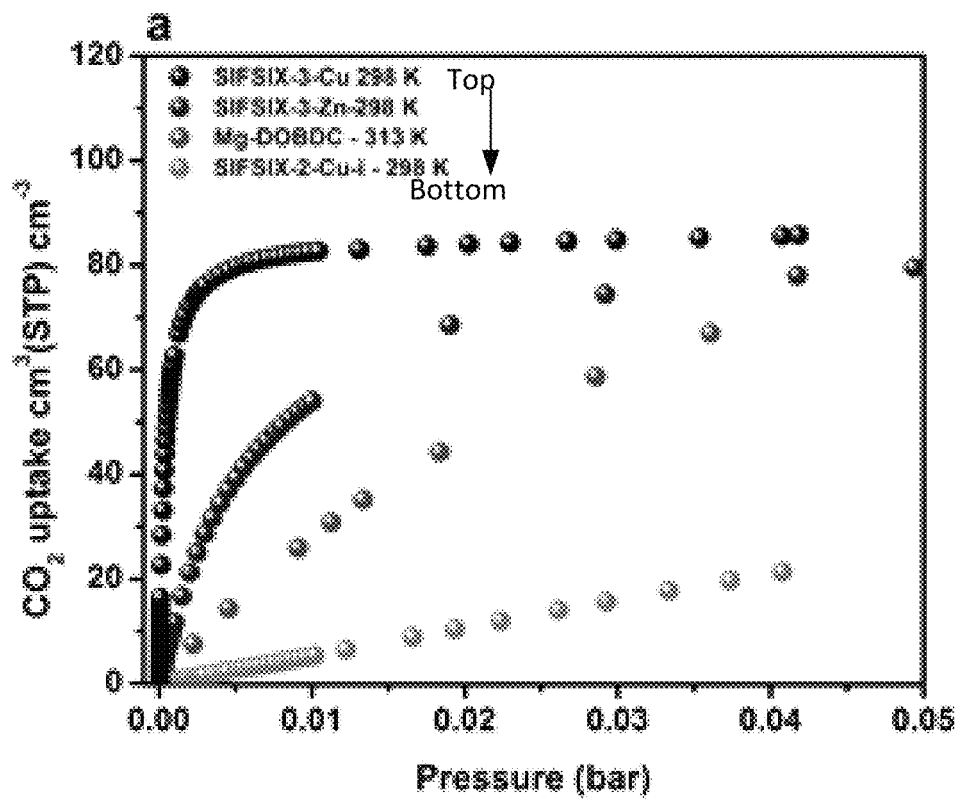
FIG. 3A illustrates the $CO_2$ volumetric uptake on SIFSIX-Cu-3, SIFSIX-Zn-3 and SIFSIX-Cu-2-i as compared to Mg-MOF-74.
Figure 10:
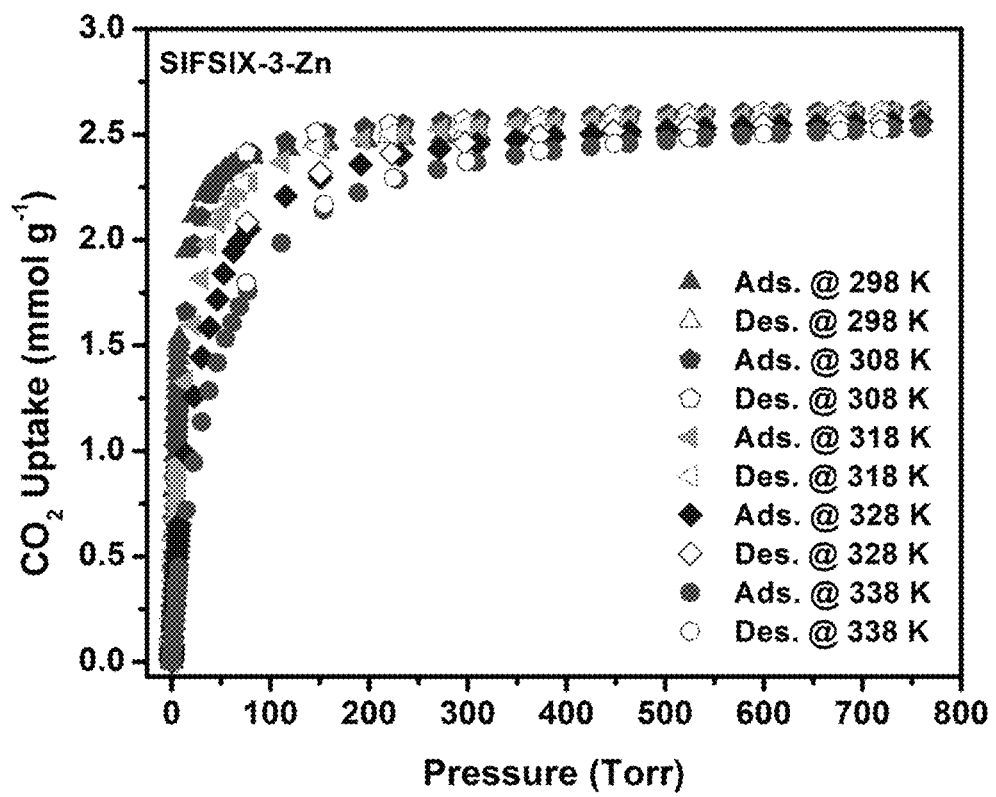
FIG. 10 illustrates variable temperature adsorption isotherms for SIFISX-3-Zn.
Figure 14:
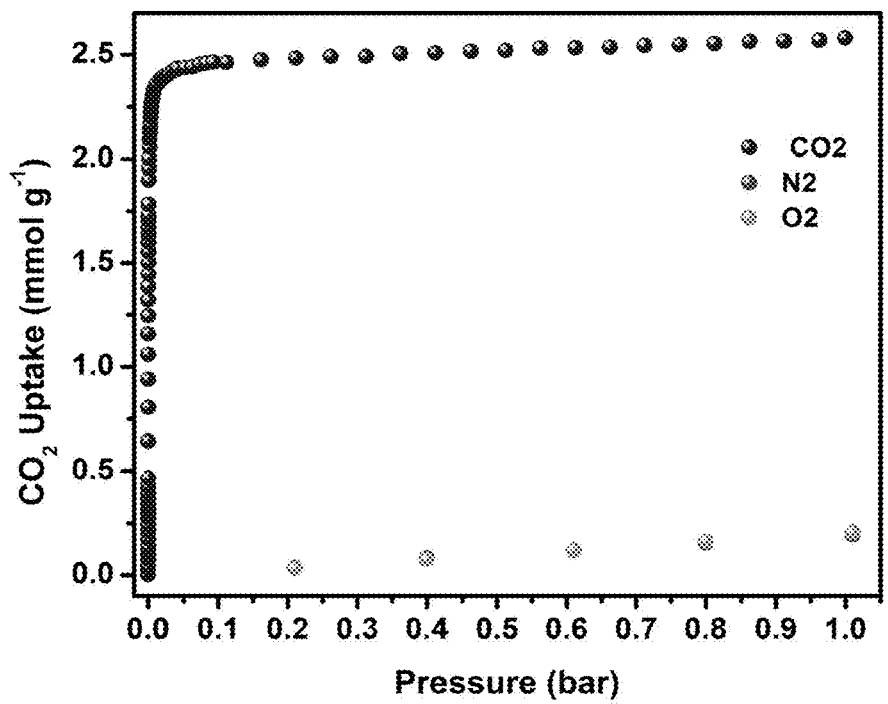
FIG. 14 illustrates adsorption isotherms of $CO_2$, $N_2$ and $O_2$ on Sif6-3-cu at 298 K.

The mechanistic behind the unprecedented selective $CO_2$ adsorption involving the unique synergetic effect of thermodynamics and kinetics[23] was confirmed by the competitive kinetics of $CO_2/N_2$: 10/90 gas mixture adsorption (FIG. 14). As was expected and based on the similar study carried out on the Zn analogue,[23] the uptake at equal times for variable $CO_2$ compositions mixtures follow the behaviour of pure $CO_2$ (FIG. 10). In addition at equilibrium, the total uptake of the $CO_2$ containing gas mixtures overlay perfectly with the equilibrium uptake for pure $CO_2$ (FIG. 10). These findings show that similarly to SIFSIX-3-Zn, when $CO_2$ containing mixtures are in contact with SIFSIX-3-Cu, $CO_2$ adsorbs more strongly and faster than $N_2$ (and by analogy also $O_2$, $CH_4$ and $H_2$ (FIG. 14, thus occupying all the available space and sorption sites and excluding other gases which is a desirable feature in many $CO_2$ separation and purification applications. Examination of the SIFSIX-3-M adsorption results in the spectra of low concentration applications (400 ppm-5%) showed that the Cu analogue exhibits even steeper adsorption isotherms at very low $CO_2$ concentration (FIG. 3a) translated into the highest uptake ever reported for MOFs without UMC or amino groups at low $CO_2$ pressure below 38 torr (0.05 bar). This unprecedented finding is even more interesting owing to its fully physical adsorption nature where complete desorption of $CO_2$ was established at only 323 K. At 7.6 torr (0.01 bar) SIFSIX-3-Cu exhibited 82.6 cm$^3$(STP)/cm$^3$ vs. 55 and 28 cm$^3$(STP)/cm$^3$ for SIFSIX-3-Zn and Mg-MOF-74, respectively. Interestingly, the gravimetric uptake of SIFSIX-3-Cu at 400 ppm and 298 K (1.24 mmol/g) is 10 and 15.5 times higher than the corresponding uptakes for SIFSIX-3-Zn (0.13 mmol/g) and Mg-MOF-74 (0.08 mmol/g) and even higher than the uptake of most of amine-supported silica materials (with optimal compromise of amine loading and kinetics)[32] at 298 K (for example TRI-PE-MCM-4[11-23] (1 mmol/g)). Table 1 shows a summary of the adsorption uptake at variable low $CO_2$ concentration (partial pressures) for SIFSIX compounds as compared to Mg-MOF-74 and amine supported materials (including MOFs); relevant to different traces $CO_2$ removal applications. It is to notice that SIFSIX-3-Cu showed even higher $CO_2$ uptake at 400 ppm and 328 K as compared to the corresponding uptake at 323 K for amine functionalized Mg-dobpdc-mmen (Table S3).

TABLE 1

(($CO_2$ adsorption uptake at various traces $CO_2$ concentration and at 298 K in comparison to various amine supported materials))

| Adsorbent | uptake at 400 ppm (0.4 mbar) | Uptake at 5000 ppm (5 mbar) | Uptake at 10000 ppm (10 mbar) | $CO_2$ Qst (kJ/mol) |
|---|---|---|---|---|
| SIFSIX-2-Cu-i | 0.0684$^c$/0.2$^d$ | 0.097$^c$/2.7$^d$ | 0.19$^c$/5.32$^d$ | 32 |
| SIFSIX-3-Zn | 0.13$^c$/5.6$^d$ | 1.12$^c$/39.26$^d$ | 1.53$^c$/53.97$^d$ | 45 |
| SIFSIX-3-Cu | 1.24$^c$/43.9$^d$ | 2.26$^c$/79.8$^d$ | 2.34$^c$/82.5$^d$ | 54 |
| Mg-MOF-74 | 0.088$^c$/1.8$^d$ | 0.7$^c$/14.3$^d$ | 1.27$^c$/25.86$^d$ | 47 |
| Mg-MOF-74-ED$^a$ | 1.5$^c$ | ND | ND | ND |
| Mg-dobpdc-mmen$^b$ | 2$^c$ | 2.5$^c$ | 2.75$^c$ | 70 |
| TRI-PE-MCM-41$^f$ | 1$^c$ | 1.45$^c$ | 1.6$^c$ | 92 |
| HAS$^f$ | 1.7$^c$ | ND | ND | ND |

Figure 3B:
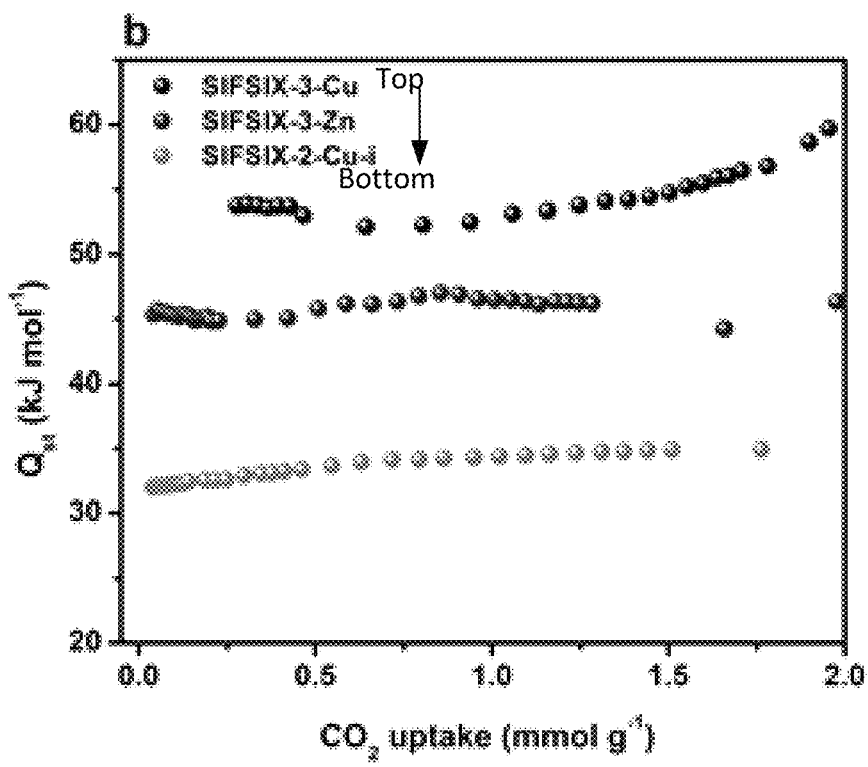
FIG. 3B illustrates the isosteric heats of adsorption at low coverage for SIFSIX-Cu-3, SIFSIX-Zn-3 and SIFSIX-Cu-2-i.

$^a$((Ethylenediamine functionnalized[24]));
$^b$((N,N-dimethylethylenediamine functionnalized[25]));
$^c$mmol/g;
$^d$cm$^3$(STP)/cm$^3$;
$^e$at 328 K;
$^f$Amine supported silica.
ND: non determined;

Interestingly, upon the substitution of Zn by Cu, the $Q_{st}$ of $CO_2$ adsorption in the contracted structure increased by 20%, from 45 to 54 kJ mol$^{-1}$ (FIG. 3b), in perfect agreement with the relatively steeper $CO_2$ adsorption isotherms in case of the Cu analogue at very low pressure. This increase is mainly attributed to the small unit cell and the small pore size of the Cu analogue. The $Q_{st}$ of $CO_2$ adsorption is an intrinsic property that dictates the affinity of the pore surface toward $CO_2$; this in turn plays a major role in determining the adsorption selectivity and the necessary energy to release $CO_2$ during the regeneration step. Although the $Q_{st}$ for $CO_2$ was slightly above the range of fully reversible $CO_2$ adsorption (30-50 kJ mol$^{-1}$)[23], SIFSIX-3-Cu was fully evacuated at 50° C. in vacuum (or in $N_2$ environment). As in case of SIFSIX-3-Zn and SIFSIX-2-Cu-i, the $Q_{st}$ for $CO_2$ adsorption was relatively constant up to high $CO_2$ loadings indicating homogenous binding sites over the full range of $CO_2$ loading (FIG. 3b).[23]

The $CO_2$ selectivity of SIFSIX-3-Zn and SIFSIX-3-Cu was investigated experimentally using column breakthrough tests for binary $CO_2/N_2$:1000 ppm/99.99% mixture (FIG. 4 left) at 298 K in dry as well as in humid conditions. In dry condition, the first $CO_2$ signal downstream the column was observed only after ca. 798 and ca.1922 min/g for SIFSIX-3-Zn and SIFSIX-3-Cu, respectively after starting continuous $CO_2/N_2$ gas mixture flux (5 cm$^3$min$^{-1}$), while $N_2$ breakthrough occurred in a few seconds. Accordingly, at 1000 ppm $CO_2$ and breakthrough time, SIFSIX-3-Cu showed higher selectivity (ca. 10500) than SIFSIX-3-Zn (7259). We also note that the calculated and measured selectivity exceeding 1000-2000 are often subject to uncertainties associated with measurement of the gas uptake of weakly adsorbed gases ($N_2$) in the mixture, thus the reported selectivity is highly qualitative and aiming the comparison of the studied compounds only.

Figure 4A:
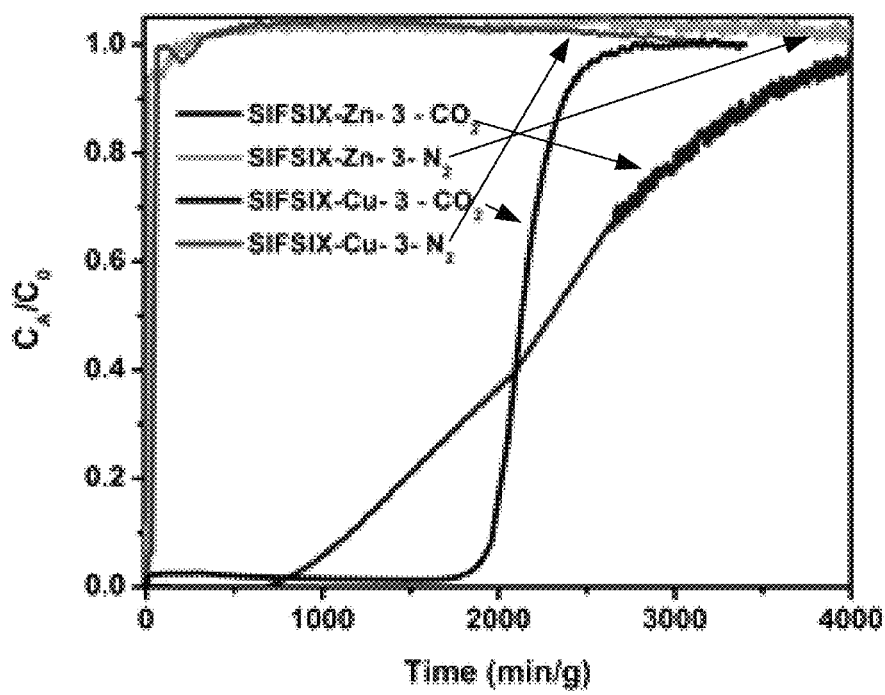
FIG. 4A illustrates the column breakthrough test of $CO_2$/$N_2$:1000 ppm/99.99% for SIFSIX-Cu-3, SIFSIX-Zn-3 in dry condition.
Figure 4B:
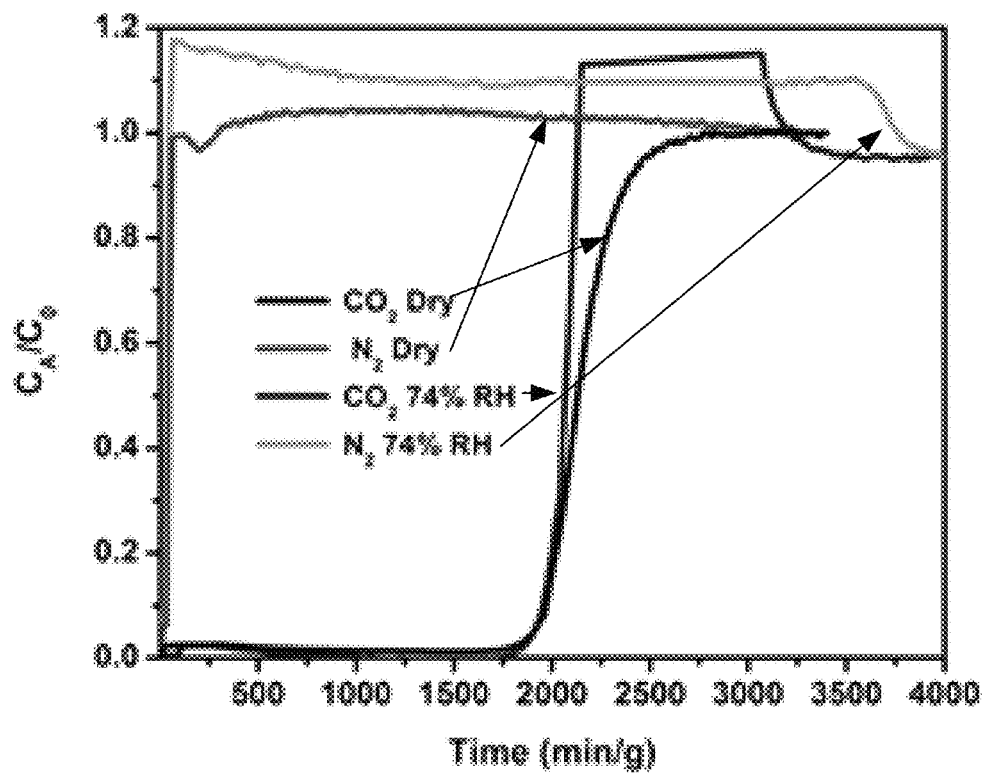
FIG. 4B illustrates the column breakthrough test of $CO_2$/$N_2$:1000 ppm/99.99% for SIFSIX-Cu-3 in dry as well as at 74% RH.
Figure 15:
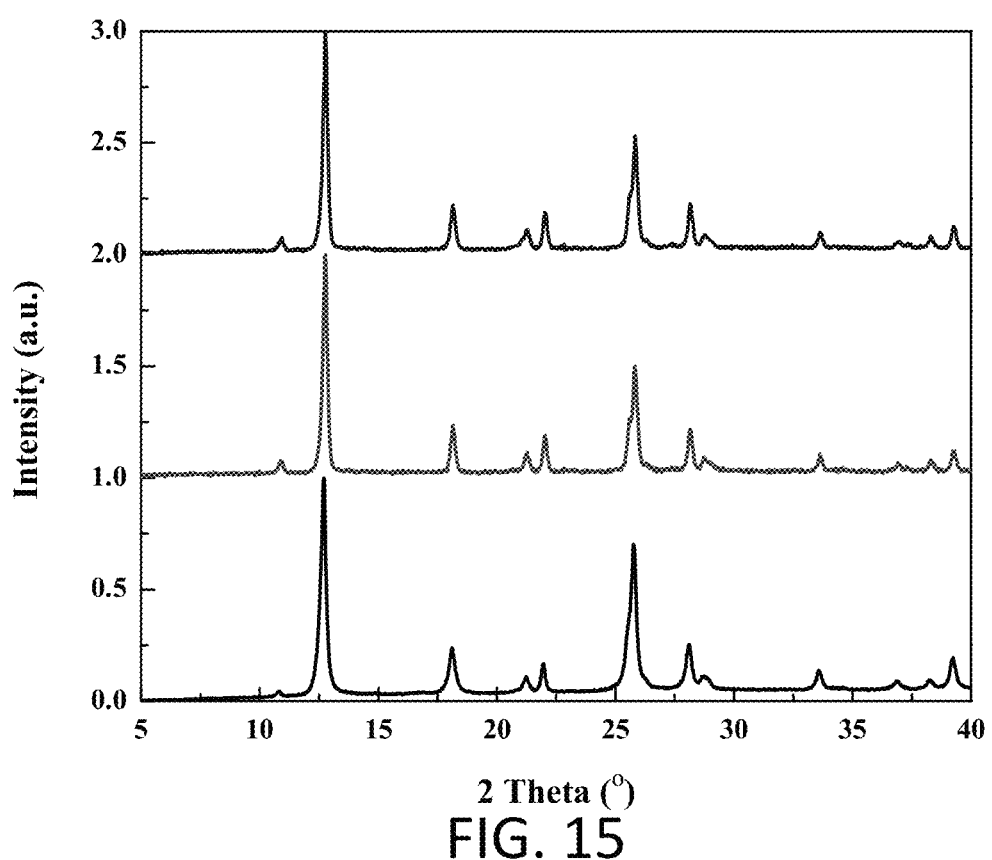
FIG. 15 illustrates a comparison of experimental PXRD diagrams for SIFSIX-3-Cu ($\lambda_{Cu}$=1.5406 nm) as prepared (bottom curve), after high pressure experiments and exposed to air (middle curve) and after break-through experiments under dry and humid conditions (top curve).

The $CO_2$ removal selectivity at 1000 ppm $CO_2$ on SIFSIX-3-Cu was not affected by the presence of humidity as shown from the column breakthrough tests performed on both compounds at the relative humidity (RH) of 74% (FIG. 4(right)). This unprecedented finding was also valid in case of SIFSIX-3-Zn for the removal of low (FIG. 15) and higher $CO_2$ concentration.[23]

In conclusion, we showed herein how a material design and engineering approaches to pore size control in combination with suitable energetics of favourable electrostatics from an array of inorganic anions affords MOFs with unprecedented $CO_2$ uptake and selectivity in the context of air capture and traces $CO_2$ removal. These materials exhibit very high (non-reactive) $CO_2$ energetics but fully reversible physical driven adsorption-desorption operations at very mild conditions, without the well documented drawbacks associated with amine reactive chemistry.

This work shows for the first time that thanks to their ability for rational pore size modification and inorganic-organics moieties substitution, MOFs offers remarkable $CO_2$ adsorption attributes in highly diluted gas streams that other plain class of materials are unable to achieve. Further works will be dedicated to study the effect of substituting other metals such as cadmium, cobalt, chromium etc., on the $CO_2$ separation properties in diluted $CO_2$-containing gases.

Methods: SIFSIX-3-Cu:

A methanol solution (5.0 mL) of pyrazine (pyz, 0.30 g, 3.0 mmol) was layered in a glass tube onto a methanol solution (5.0 mL) of CuSiF$_6$·xH$_2$O (0.325 g, 0.6 mmol). Upon layering, a fast formation of light violet powder was observed, and the powder was left for 24 hours in the mother solution. The powder was then collected and washed extensively with methanol then dried under vacuum Characterization:

The powder PXRD patterns were recorded on a Panalytical X'pert PRO MPD X-ray Diffractometer with Cu K$\alpha$ radiation ($\lambda$=0.15418 nm, 45 kV, 40 mA).

Low pressure gas sorption measurements were performed on a fully automated micropore gas analyzer Autosorb-1C (Quantachrome Instruments) at relative pressures up to 1 atm. The cryogenic temperatures were controlled using a liquid nitrogen bath at 77 K. Pore size analyses were performed using a cylindrical NLDFT pore model system by assuming an oxidic (zeolitic) surface.

High Pressure Adsorption:

Adsorption equilibrium measurements of pure gases were performed using a Rubotherm gravimetric-densimetric apparatus (Bochum, Germany) (Scheme 51), composed mainly of a magnetic suspension balance (MSB) and a network of valves, mass flowmeters and temperature and pressure sensors. The MSB overcomes the disadvantages of other commercially available gravimetric instruments by separating the sensitive microbalance from the sample and the measuring atmosphere and is able to perform adsorption measurements across a wide pressure range, i.e. from 0 to 20 MPa. The adsorption temperature may also be controlled within the range of 77 K to 423 K. In a typical adsorption experiment, the adsorbent is precisely weighed and placed in a basket suspended by a permanent magnet through an electromagnet. The cell in which the basket is housed is then closed and vacuum or high pressure is applied. The gravimetric method allows the direct measurement of the reduced gas adsorbed amount Q. Correction for the buoyancy effect is required to determine the excess and absolute adsorbed amount using equation 1 and 2, where Vadsorbent and Vss and Vadsorbed phase refer to the volume of the adsorbent, the volume of the suspension system and the volume of the adsorbed phase, respectively.

$$\Omega = m_{absolute} - \rho_{gas}(V_{adsorbent} + V_{ss} + V_{adsorbed\text{-}phase}) \quad (1)$$

$$\Omega = m_{excess} - \rho_{gas}(V_{adsorbent} + V_{ss}) \quad (2)$$

The buoyancy effect resulted from the adsorbed phase maybe taken into account via correlation with the pore volume or with the theoretical density of the sample.

Structure Determination

DICVOL06 was used for pattern indexing of SIFSIX-3-Cu; the cell refinement was carried out by a structureless whole pattern profile refinement using the FullProf software and its graphical interface WinPlotr. (*J. Epdic 7: European Powder Diffraction, Pts 1 and 2* Vol. 378-3 Materials Science Forum (eds R. Delhez & E. J. Mittemeijer) 118-123 (2001)) The structure of SIFSIX-3-Cu was solved ab initio on the as-synthesized solid using powder X-Ray diffraction (PXRD) data by direct method using Expo2009. (*J. Appl. Crystallogr.* 42, 1197-1202, (2009)). All framework atoms were found directly and their coordinates geometrically and energetically refined through Forcite in Materials Studio 6.0.0.

TABLE S1

Comparison of characteristic interatomic distances in SIFSIX based MOFs

| MOF | $d_{M-N}$ (Å) | $d_{M-F1}$ (Å) | $D_{Si-F1}$ (Å) | $D_{Si-F2}$ (Å)† | reference | Ligand |
|---|---|---|---|---|---|---|
| SIFSIX-1-Zn | 2.157 | 2.082 | 1.757 | 1.600 | 3 | 4,4'-bipyridine |
|  | 2.131 | 2.122 | 1.720 | 1.650 | 4 |  |
| SIFSIX-1-Cu | 2.007 | 2.379 | 1.703 | 1.672 | 5 |  |
|  | 2.009 | 2.357 | 1.698 | 1.609 | 6 |  |
|  | 1.966 | 2.336 | 1.692 | 1.685 | 7 |  |
| SIFSIX-2-Zn | 2.125 | 2.069 | 1.698 | 1.668 | 4 | bpy-2 |
| SIFSIX-2-Cu | 2.027 | 2.300 | 1.684 | 1.684 | 8 |  |
| SIFSIX-2i-Cu | 2.015 | 2.353 | 1.693 | 1.679 | 8 |  |
| SIFSIX-3-Zn | 2.172 | 2.057 | 1.747 | 1.657 | 9 | pyrazine |
| SIFSIX-3-Cu | 2.046 | 2.259 | 1.684 | 1.686 | this work |  |
| SIFSIX-2D-Cu | 2.061* | 2.402 | 1.727 | 1.688 | 9 |  |
| SIFSIX-2D-H$_2$O—Cu | 2.031 | 2.412 | 1.695 | 1.675 | 7 |  |
| SIFSIX-4-Zn | 2.117 | 2.062 | 1.712 | 1.653 | 4 | tripyridyl-benzene |
| SIFSIX-5-Cu | 2.012 | 2.258 | 1.727 | 1.681 | 5 | bpe |

†Average distance, due to disorder of F atoms.
*Average distance, due to lower symmetry, SIFSIX-2D contains two independent N atoms bonded to Cu 3 Subramanian, S. & Zaworotko, M. J. Porous Solids by Design-[Zn(4,4'-Bpy)(2)(Sif6)](N)Center-Dot-Xdmf, a Single Framework Octahedral Coordination Polymer with Large Square Channels (Vol 34, Pg 2127, 1995). *Angew. Chem. Int. Ed.* 34, 2127-2129, (1995).
4 Lin, M.-J., Jouaiti, A., Kyritsakas, N. & Hosseini, M. W. Molecular tectonics: modulation of size and shape of cuboid 3-D coordination networks. *Crystengcomm* 11, 189-191, (2009).
5 Burd, S. D. et al. Highly Selective Carbon Dioxide Uptake by Cu(bpy-n)2(SiF6)(bpy-1=4,4'-Bipyridine; bpy-2=1,2-Bis(4-pyridyl)ethene). *J. Am. Chem. Soc.* 134, 3663-3666, (2012).
6 Noro, S., Kitagawa, S., Kondo, M. & Seki, K. A new, methane adsorbent, porous coordination polymer [{CuSiF6(4,4'-bipyridine)(2)}(n)]. *Angew. Chem. Int. Ed.* 39, 2082-+, (2000).
7 Noro, S. et al. Framework engineering by anions and porous functionalities of Cu(II)/4,4'-bpy coordination polymers. *J. Am. Chem. Soc.* 124, 2568-2583, (2002).
8 Nugent, P. et al. Porous materials with optimal adsorption thermodynamics and kinetics for CO2 separation. *Nature* 495, 80-84, (2013).
9 Uemura, K., Maeda, A., Maji, T. K., Kanoo, P. & Kita, H. Syntheses, Crystal Structures and Adsorption Properties of Ultramicroporous Coordination Polymers Constructed from Hexafluorosilicate Ions and Pyrazine. *Eur. J. Inorg. Chem.*, 2329-2337, (2009).

TABLE S2

Crystallographic data of SIFSIX-3-Cu.

| Compound | SIFSIX-3-Cu |
|---|---|
| Formula (dried solid) | C$_8$N$_4$H$_8$CuSiF$_6$ |
| Molar weight (g.mol$^{-1}$) | 365.80 |
| Calculated density (g.cm$^{-3}$) (dried solid) | 1.62 |
| Symmetry | Tetragonal |
| Space group | P 4/m m m (n° 123) |
| a (Å) | 6.901(1) |
| b (Å) | 6.901(1) |
| c (Å) | 7.886(1) |
| V (Å$^3$) | 375.5 |
| Z | 1 |
| Wavelength λ(Cu Kα) | 1.5406 |
| Temperature (K) | 298 |
| Angular range 2-theta (°) | 3-80 |
| Number of independent atoms (dried solid) | 8 |

TABLE S3

Gravimetric CO$_2$ uptake at 400 ppm and 328 K for SiF6—Cu-3, SiF6—Zn-3 and SiF6—Cu-2-i in comparison to Mg-dobpdc-mmen

| Adsorbent | Uptake at 400 ppm (0.4 mbar) mmm/g |
|---|---|
| SIF6-2-Cu-i | negligible |
| SIF6-3-Zn | 0.0287 |
| SIF6-3-Cu | 0.242 |
| Mg-dobpdc-mmen$^b$ | ≈0.12 |

$^b$at 323 K

REFERENCES

1 Chu, S. Carbon Capture and Sequestration. *Science* 325, 1599-1599, doi:10.1126/science.1181637 (2009).

2 Lackner, K. S. & Wright, A. B. Removal of carbon dioxide from fluid involves bringing the gas in contact with resin, wetting resin with water, collecting water vapor and carbon dioxide, separating and delivering carbon dioxide for further processing. WO2009105566-A2; US2009232861-A1; WO2009105566-A3; MX2010009059-A1; CA2715874-A1.

3 Major, C. J., Sollami, B. J. & Kammerme, K. CARBON DIOXIDE REMOVAL FROM AIR BY ADSORBENTS. *Industrial & Engineering Chemistry Process Design and Development* 4, 327-&, doi:10.1021/i260015a019 (1965).

4. Stolaroff, J. K., Keith, D. W. & Lowry, G. V. Carbon dioxide capture from atmospheric air using sodium hydroxide spray. *Environmental Science & Technology* 42, 2728-2735, doi:10.1021/es702607w (2008).
5. Nikulshina, V., Gebald, C. & Steinfeld, A. CO2 capture from atmospheric air via consecutive CaO-carbonation and CaCO3-calcination cycles in a fluidized-bed solar reactor. *Chemical Engineering Journal* 146, 244-248, doi:10.1016/j.cej.2008.06.005 (2009).
6. Goeppert, A., Czaun, M., Prakash, G. K. S. & Olah, G. A. Air as the renewable carbon source of the future: an overview of CO2 capture from the atmosphere. *Energy & Environmental Science* 5, 7833-7853, doi:10.1039/c2ee21586a (2012).
7. Rege, S. U., Yang, R. T. & Buzanowski, M. A. Sorbents for air prepurification in air separation. *Chemical Engineering Science* 55, 4827-4838, doi:10.1016/s0009-2509(00)00122-6 (2000).
8. Rege, S. U., Yang, R. T., Qian, K. Y. & Buzanowski, M. A. Air-prepurification by pressure swing adsorption using single/layered beds. *Chemical Engineering Science* 56, 2745-2759, doi:10.1016/s0009-2509(00)00531-5 (2001).
9. Santos, J. C., Magalhaes, F. D. & Mendes, A. Contamination of zeolites used in oxygen production by PSA: Effects of water and carbon dioxide. *Industrial & Engineering Chemistry Research* 47, 6197-6203, doi:10.1021/ie800024c (2008).
10. Kordesch, K. et al. Alkaline fuel cells applications. *J. Power Sources* 86, 162-165 (2000).
11. Haring, H. W. Industrial Gases Processing. *Wiley-VCH Verlag GmbH & Co: Weinheim* (2008).
12. Belmabkhout, Y., Serna-Guerrero, R. & Sayari, A. Adsorption of CO2-containing gas mixtures over amine-bearing pore-expanded MCM-41 silica: application for CO2 separation. *Adsorption-Journal of the International Adsorption Society* 17, 395-401, doi:10.1007/s10450-011-9348-0 (2011).
13. Ernsting, J. Breathing systems in aerospace. *IEE Seminar. Low Flow Anaesthesia Breathing Systems—Technology, Safety and Economics (Ref. No. 1999/060)*, 7/1-4 (1999).
14. Satyapal, S., Filburn, T., Trela, J. & Strange, J. Performance and properties of a solid amine sorbent for carbon dioxide removal in space life support applications. *Energy & Fuels* 15, 250-255, doi:10.1021/ef0002391 (2001).
15. Mattox, E. M., Knox, J. C. & Bardot, D. M. Carbon dioxide removal system for closed loop atmosphere revitalization, candidate sorbents screening and test results. *Acta Astronautica* 86, 39-46 (2013).
16. Moore, P. Miner Protection. *Mining Magazine* 196, 35-38 and 40-41 (2007).
17. Dosch, M. P. The Anesthesia Gas Machine. http://www.udmercy.edu/crna/agm (2006).
18. http://www.geheathcare.com/euen/anesthesia/products/airway-management-accesories-supplies/medisorb-CO2-absorbent/index.html.
19. Sayari, A. & Belmabkhout, Y. Stabilization of Amine-Containing CO2 Adsorbents: Dramatic Effect of Water Vapor. *Journal of the American Chemical Society* 132, 6312-6313, doi:10.1021/ja1013773 (2010).
20. Caskey, S. R., Wong-Foy, A. G. & Matzger, A. J. Dramatic tuning of carbon dioxide uptake via metal substitution in a coordination polymer with cylindrical pores. *Journal of the American Chemical Society* 130, 10870-10873, doi:10.1021/ja8036096 (2008).
21. Sumida, K. et al. Carbon Dioxide Capture in Metal-Organic Frameworks. *Chemical Reviews* 112, 724-781, doi:10.1021/cr2003272 (2012).
22. Sayari, A., Belmabkhout, Y. & Serna-Guerrero, R. Flue gas treatment via CO2 adsorption. *Chemical Engineering Journal* 171, 760-774, doi:10.1016/j.cej.2011.02.007 (2011).
23. Nugent, P. et al. Porous materials with optimal adsorption thermodynamics and kinetics for CO2 separation. *Nature* 495, 80-84, doi:10.1038/nature11893 (2013).
24. Xue, D. X. et al. Tunable Rare-Earth fcu-MOFs: A Platform for Systematic Enhancement of CO2 Adsorption Energetics and Uptake. *J. Am. Chem. Soc.* 135, 7660-7667 (2013).
25. Belmabkhout, Y. & al., e. Highly stable rht-MOF decorated with nitrogen donor groups: An unprecedented step toward trace carbon dioxide removal. *Energy & Environmental science* submitted (2013).
26. McDonald, T. M. et al. Capture of Carbon Dioxide from Air and Flue Gas in the Alkylamine-Appended Metal-Organic Framework mmen-Mg-2(dobpdc). *Journal of the American Chemical Society* 134, 7056-7065, doi: 10.1021/ja300034j (2012).
27. Choi, S., Drese, J. H., Eisenberger, P. M. & Jones, C. W. Application of Amine-Tethered Solid Sorbents for Direct $CO_2$ Capture from the Ambient Air. *Environmental Science & Technology* 45, 2420-2427, doi:10.1021/es102797w (2011).
28. Didas, S. A., Kulkarni, A. R., Sholl, D. S. & Jones, C. W. Role of Amine Structure on Carbon Dioxide Adsorption from Ultradilute Gas Streams such as Ambient Air. *Chemsuschem* 5, 2058-2064, doi:10.1002/cssc.201200196 (2012).
29. Xiang, S. et al. Microporous metal-organic framework with potential for carbon dioxide capture at ambient conditions. *Nature Communications* 3, doi:10.1038/ncomms1956 (2012).
30. Uemura, K., Maeda, A., Maji, T. K., Kanoo, P. & Kita, H. Crystal structures and adsorption properties of ultramicroporous coordiunation polymers constructed ions from hexafluorosilicate ions and pyrazine. *Eur. J. inorg. Chem.*, 2329-2337 (2009).
31. Conley, B. D., Yearwood, B. C., Parkin, S. & Atwood, D. A. Ammonium hexaflurosilicate salts. *Journal of Fluorine Chemistry* 115, 155-160 (2002).
32. It is important to notice that hyperbranched aminosilica material (HAS)25 was reported to exhibit higher gravimetric uptake (1.7 mmol/g) at 390 ppm and 298 K, however the kinetics of adsorption was much slower due the diffusion limitation caused by the high amine loading. To overcome this issue, The strategy of use of highly porous materials as MOFs as support for amine grafting is a clever pathway to develop highly $CO_2$ selective MOFs with high uptake and optimal $CO_2$ adsorption kinetics as reported recently[27,28]. ED amine grafted Mg-dobdc[27] and N,N-dimethylethylenediamine Mg-dobdc[28] were reported recently to exhibit 1.5 and 2 mmol/g uptake at 390 ppm, respectively. Nevertheless reactive air capture of $CO_2$ using amines may have relatively larger energy input in term of desorption and regeneration options is yet to be studied.

In regard to the discussion herein including the Examples above and the claims, it should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to measurement techniques and the units of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A system for capturing $CO_2$ in a gas, comprising:
   a first structure including a metal-organic material (MOM), wherein the MOM includes at least one of an inorganic linker or an inorganic pillar, wherein the gas includes $CO_2$ and water vapor, wherein the MOM has a greater relative affinity for $CO_2$ over a water; and
   a second structure for introducing the gas to the first structure, wherein the first structure is configured to remove $CO_2$ from the gas to form a modified gas, wherein the second structure is configured to flow the modified gas away from the first structure so the $CO_2$ is captured in the first structure to the exclusion of the modified gas.

2. The system of claim 1, wherein the gas includes at least one of the following gases: $N_2$, $H_2$, and $CH_4$, wherein the MOM has a greater relative affinity for $CO_2$ over each one of $N_2$, $H_2$, and $CH_4$.

3. The system of claim 1, wherein the MOM is $[Cu(pyr)_2(SiF_6)]_n$, wherein n is 1 to 100,000,000, and wherein the MOM has a pore size of about 3.35 Å.

4. The system of claim 1, wherein the MOM is a hydrophobic MOM.

5. The system of claim 1, wherein the MOM is selected from the group consisting of: $[Cu(4,4'-dipyridylacetylene)_2(SiF_6)]_n$, where n is 1 to 100,000,000; a pair of interpenetrated nets of $[Cu(4,4'-dipyridylacetylene)_2(SiF_6)]_n$; and $[Zn(pyr)_2(SiF_6)]_n$, wherein n is 1 to 100,000,000.

6. The system of claim 1, wherein the MOM has a primitive cubic topology.

7. The system of claim 1, wherein the gas includes $CO_2$ at a concentration of 5% or less.

* * * * *